(12) United States Patent
Li et al.

(10) Patent No.: US 7,382,135 B2
(45) Date of Patent: Jun. 3, 2008

(54) DIRECTIONAL ELECTROMAGNETIC WAVE RESISTIVITY APPARATUS AND METHOD

(75) Inventors: Qiming Li, Sugar Land, TX (US);
Lawrence Chou, Pearland, TX (US);
Dzevat Omeragic, Sugar Land, TX (US); Libo Yang, Sugar Land, TX (US); Alain Dumont, Houston, TX (US); Lingyun Hu, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 200 days.

(21) Appl. No.: 10/709,212

(22) Filed: Apr. 21, 2004

(65) Prior Publication Data

US 2005/0140373 A1    Jun. 30, 2005

Related U.S. Application Data

(60) Provisional application No. 60/472,686, filed on May 22, 2003.

(51) Int. Cl.
*G01B 3/08* (2006.01)
(52) U.S. Cl. ..................................... 324/338
(58) Field of Classification Search ........ 324/332–343; 702/7, 6, 9, 10, 11; 175/50
See application file for complete search history.

(56) References Cited

U.S. PATENT DOCUMENTS

| 4,319,191 | A |  | 3/1982 | Meador et al. |
| 4,766,384 | A |  | 8/1988 | Kleinberg et al. |
| 4,980,643 | A | * | 12/1990 | Gianzero et al. ........... 324/339 |
| 5,115,198 | A |  | 5/1992 | Gianzero et al. |
| 5,235,285 | A |  | 8/1993 | Clark et al. |
| 5,406,206 | A |  | 4/1995 | Safinya et al. |

(Continued)

FOREIGN PATENT DOCUMENTS

| RU | 2 069 878 | 11/1996 |
| RU | 2 107 313 | 3/1998 |

OTHER PUBLICATIONS

T.R.Tribe et al., "Precise Well Placement using Rotary Steerable Systems and LWD Measurements," SPE 71396, SPE Annual Technical Conference and Exhibition, New Orleans, LA, Sep. 30, 2001-Oct. 3, 2001.

*Primary Examiner*—Reena Aurora
*Assistant Examiner*—Kenneth J Whittington
(74) *Attorney, Agent, or Firm*—Bryan L. White; Darla Funseca; Brigitte Echols

(57) ABSTRACT

A novel on-the-fly data processing technique is useful for extracting signals from the azimuthal variation of the directional measurements acquired by a logging tool within a borehole. The relevant boundary, anisotropy and fracture signals are extracted from the formation response through fitting of the azimuthal variation of the measured voltages to some sinusoidal functions. The orientation of the bedding is also obtained as a result. The extracted directional signals are useful for obtaining boundary distances and making geosteering decisions. Two techniques involving inversion and cross-plotting may be employed, depending on the nature of the boundary. A Graphical User Interface (GUI) is part of a system to facilitate flexible definition of inversion objectives, for improving the inversion results, and for visualization of the formation model as well as inversion measurements.

31 Claims, 12 Drawing Sheets

U.S. PATENT DOCUMENTS

| | | |
|---|---|---|
| 5,508,616 A | 4/1996 | Sato et al. |
| 5,517,464 A | 5/1996 | Lerner et al. |
| 5,757,191 A | 5/1998 | Gianzero |
| 5,781,436 A | 7/1998 | Forgang et al. |
| 6,044,325 A | 3/2000 | Chakravarthy et al. |
| 6,147,496 A | 11/2000 | Strack et al. |
| 6,163,155 A | 12/2000 | Bittar |
| 6,181,138 B1 | 1/2001 | Hagiwara et al. |
| 6,297,639 B1 | 10/2001 | Clark et al. |
| 6,304,086 B1 | 10/2001 | Minerbo et al. |
| 6,351,127 B1 | 2/2002 | Rosthal et al. |
| 6,380,744 B1 | 4/2002 | Clark et al. |
| 6,476,609 B1 | 11/2002 | Bittar |
| 6,541,979 B2 | 4/2003 | Omeragic |
| 6,556,015 B1 | 4/2003 | Omeragic et al. |
| 6,557,794 B2 | 5/2003 | Rosthal et al. |
| 6,566,881 B2 | 5/2003 | Omeragic et al. |
| 6,573,222 B1 | 6/2003 | Nair et al. |
| 6,584,408 B2 | 6/2003 | Omeragic |
| 6,594,584 B1 | 7/2003 | Omeragic et al. |
| 6,624,634 B2 | 9/2003 | Rosthal et al. |
| 6,630,830 B2 | 10/2003 | Omeragic et al. |
| 6,636,045 B2 * | 10/2003 | Tabarovsky et al. ........ 324/343 |
| 6,667,620 B2 | 12/2003 | Homan et al. |
| 6,937,022 B2 | 8/2005 | Wang et al. |
| 2002/0057210 A1 | 5/2002 | Frey et al. |
| 2002/0079899 A1 | 6/2002 | Frey et al. |
| 2003/0085707 A1 | 5/2003 | Minerbo et al. |
| 2003/0184302 A1 | 10/2003 | Omeragic et al. |
| 2003/0184304 A1 | 10/2003 | Homan et al. |
| 2003/0184488 A1 | 10/2003 | Smith et al. |
| 2003/0200029 A1 | 10/2003 | Omeragic et al. |
| 2003/0229450 A1 | 12/2003 | Strickland |
| 2004/0046560 A1 | 3/2004 | Istkovich et al. |
| 2004/0046561 A1 | 3/2004 | Istkovich et al. |
| 2004/0100263 A1 * | 5/2004 | Fanini et al. ................ 324/339 |
| 2004/0108853 A1 | 6/2004 | Rosthal |
| 2004/0124841 A1 | 7/2004 | Omeragic |
| 2005/0083063 A1 | 4/2005 | Omeragic et al. |

* cited by examiner

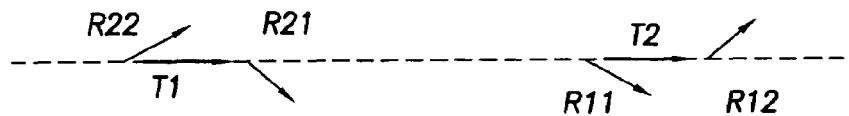
FIG.5A
FIG.5B
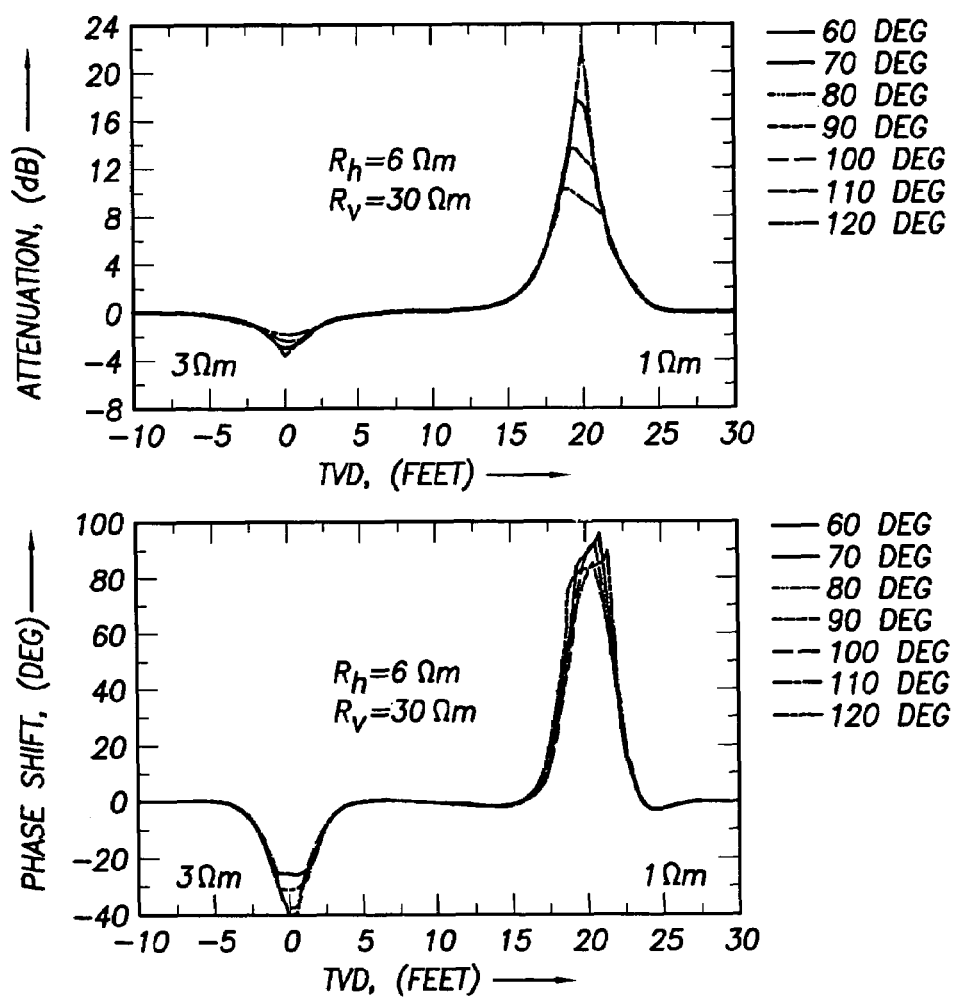

DIRECTIONAL ELECTROMAGNETIC WAVE RESISTIVITY APPARATUS AND METHOD

CROSS REFERENCE TO RELATED APPLICATIONS

This application claims the priority from U.S. Provisional Application No. 60/472,686 filed on May 22, 2003. This Provisional Application is incorporated by reference in its entirety.

BACKGROUND OF INVENTION

1. Field of the Invention

The invention relates generally to the field of well logging. More particularly, the invention relates to improved techniques in which instruments equipped with antenna systems having transverse or tilted magnetic dipole representations are used for electromagnetic measurements of subsurface formations and for placing wells with respect to geological boundaries in a reservoir. The invention has general application in the well logging art, but is particularly useful in logging-while-drilling operation.

2. Background of the Related Art

Various well logging techniques are known in the field of hydrocarbon exploration and production. These techniques typically use instruments or tools equipped with sources adapted to emit energy into a subsurface formation that has been penetrated by a borehole. In this description, "instrument" and "tool" will be used interchangeably to indicate, for example, an electromagnetic instrument (or tool), a wire-line tool (or instrument), or a logging-while-drilling tool (or instrument). The emitted energy interacts with the surrounding formation to produce signals that are then detected and measured by one or more sensors. By processing the detected signal data, a profile of the formation properties is obtained.

Electromagnetic (EM) induction and propagation logging are well-known techniques. The logging instruments are disposed within a borehole to measure the electrical conductivity (or its inverse, resistivity) of earth formations surrounding the borehole. In the present description, any reference to conductivity is intended to encompass its inverse, resistivity, or vice versa. A typical electromagnetic resistivity tool comprises a transmitter antenna and one or more (typically a pair) receiver antennas disposed at a distance from the transmitter antenna along the axis of the tool (see FIG. 1).

Induction tools measure the resistivity (or conductivity) of the formation by measuring the voltage induced in the receiver antenna(s) as a result of magnetic flux induced by currents flowing through the emitting (or transmitter) antenna. An EM propagation tool operates in a similar fashion but typically at higher frequencies than do induction tools for comparable antenna spacings (about $10^6$ Hz for propagation tools as compared with about $10^4$ Hz for the induction tools). A typical propagation tool may operate at a frequency range of 1 kHz-2 MHz.

Conventional transmitters and receivers are antennas formed from coils comprised of one or more turns of insulated conductor wire wound around a support. These antennas are typically operable as sources and/or receivers. Those skilled in the art will appreciate that the same antenna may be use as a transmitter at one time and as a receiver at another. It will also be appreciated that the transmitter-receiver configurations disclosed herein are interchangeable due to the principle of reciprocity, i.e., the "transmitter" may be used as a "receiver", and vice-versa.

The antennas operate on the principle that a coil carrying a current (e.g., a transmitter coil) generates a magnetic field. The electromagnetic energy from the transmitter antenna is transmitted into the surrounding formation, and this transmission induces eddy currents flowing in the formation around the transmitter (see FIG. 2A). The eddy currents induced in the formation, which are functions of the formation's resistivity, generate a magnetic field that in turn induces an electrical voltage in the receiver antennas. If a pair of spaced-apart receivers is used, the induced voltages in the two receiver antennas will have different phases and amplitudes due to geometric spreading and absorption by the surrounding formation. The phase difference (phase shift, $\phi$ and amplitude ratio (attenuation, A) from the two receivers can be used to derive the resistivity of the formation. The detected phase shift ($\phi$) and attenuation (A) depend on not only the spacing between the two receivers and the distances between the transmitter and the receivers, but also the frequency of EM waves generated by the transmitter.

In conventional induction and propagation logging instruments, the transmitter and receiver antennas are mounted with their axes along the longitudinal axis of the instrument. Thus, these tools are implemented with antennas having longitudinal magnetic dipole (LMD) representations. An emerging technique in the field of well logging is the use of instruments including antennas having tilted or transverse coils, i.e., where the coil's axis is not parallel to the longitudinal axis of the tool. These instruments are thus implemented with a transverse or tilted magnetic dipole (TMD) antenna. Those skilled in the art will appreciate that various ways are available to tilt or skew an antenna. Logging instruments equipped with TMD antennas are described, e.g., in: U.S. Pat. Nos. 6,163,155; 6,147,496; 5,115,198; 4,319,191; 5,508,616; 5,757,191; 5,781,436; 6,044,325; and 6,147,496.

FIG. 2A presents a simplified representation of eddy currents and electromagnetic (EM) energy flowing from a logging instrument disposed in a borehole portion or segment that penetrates a subsurface formation in a direction perpendicular to the sedimentation layers. This is not, however, an accurate depiction of all the numerous segments that make up a borehole particularly when the borehole has been directionally-drilled as described below. Thus, segments of a borehole often penetrate formation layers at an angle other than 90 degrees, as shown in FIG. 2B. When this happens, the formation plane is said to have a relative dip. A relative dip angle, $\phi$, is defined as the angle between the borehole axis (tool axis) BA and the normal N to the plane P of a formation layer of interest.

Drilling techniques known in the art include drilling boreholes from a selected geographic position at the earth's surface, along a selected trajectory. The trajectory may extend to other selected geographic positions at particular depths within the borehole. These techniques are known collectively as "directional drilling" techniques. One application of directional drilling is the drilling of highly deviated (with respect to vertical), or even horizontal, boreholes within and along relatively thin hydrocarbon-bearing earth formations (called "pay zones") over extended distances. These highly deviated boreholes are intended to greatly increase the hydrocarbon drainage from the pay zone as compared to "conventional" boreholes which "vertically" (substantially perpendicularly) to the layering of the formation, as shown in FIG. 2A) penetrate the pay zone.

In highly deviated or horizontal borehole drilling within a pay zone, it is important to maintain the trajectory of the borehole so that it remains within a particular position in the pay zone. Directional drilling systems are well known in the art which use "mud motors" and "bent subs," as well as other means, for controlling the trajectory of a borehole with respect to geographic references, such as magnetic north, the earth's gravity (vertical), and the earth's rotational velocity (with respect to inertial space). Layering of the formations, however, may be such that the pay zone does not lie along a predictable trajectory at geographic positions distant from the surface location of the borehole. Typically the borehole operator uses information (such as LWD logs) obtained during borehole drilling to maintain the trajectory of the borehole within the pay zone, and to further verify that the borehole is, in fact, being drilled within the pay zone.

Techniques known in the art for maintaining trajectory are described for example in Tribe et al., *Precise Well Placement using Rotary Steerable Systems and LWD Measurement*, Society of Petroleum Engineers, Paper 71396, Sep. 30, 2001. The technique described in this reference is based upon LWD conductivity sensor responses. If, as an example, the conductivity of the pay zone is known prior to penetration by the borehole, and if the conductivities of overlying and underlying zones provide a significant contrast with respect to the pay zone, a measure of formation conductivity made while drilling can be used as a criterion for "steering" the borehole to remain within the pay zone. More specifically, if the measured conductivity deviates significantly from the conductivity of the pay zone, this is an indication that the borehole is approaching, or has even penetrated, the interface of the overlying or underlying earth formation. As an example, the conductivity of an oil-saturated sand may be significantly lower than that of a typical overlying and underlying shale. An indication that the conductivity adjacent the borehole is increasing can be interpreted to mean that the borehole is approaching the overlying or the underlying formation layer (shale in this example). The technique of directional drilling using a formation property measurement as a guide to trajectory adjustment is generally referred to as "geosteering."

In addition to EM measurements, acoustic and radioactive measurements are also used as means for geosteering. Again using the example of an oil-producing zone with overlying and underlying shale, natural gamma radioactivity in the pay zone is generally considerably less than the natural gamma ray activity of the shale formations above and below the pay zone. As a result, an increase in the measured natural gamma ray activity from a LWD gamma ray sensor will indicate that the borehole is deviating from the center of the pay zone and is approaching or even penetrating either the upper or lower shale interface.

If, as in the prior examples, the conductivity and natural radioactivity of the overlying and underlying shale formations are similar to each other, the previously described geosteering techniques indicate only that the borehole is leaving the pay zone, but do not indicate whether the borehole is diverting out of the pay zone through the top of the zone or through the bottom of the zone. This presents a problem to the drilling operator, who must correct the borehole trajectory to maintain the selected position in the pay zone.

EM induction logging instruments are well suited for geosteering applications because their lateral (radial) depth of investigation into the formations surrounding the borehole is relatively large, especially when compared to nuclear instruments. The deeper radial investigation enables induction instruments to "see" a significant lateral (or radial) distance from axis of the borehole. In geosteering applications, this larger depth of investigation enables the detection of approaching formation layer boundaries at greater lateral distances from the borehole, which provides the drilling operator additional time to make any necessary trajectory corrections. Conventional propagation-type instruments are capable of resolving axial and lateral (radial) variations in conductivity of the formations surrounding the instrument, but the response of these instruments generally cannot resolve azimuthal variations in the conductivity of the formations surrounding the instrument. Furthermore, such instruments are unable to sense anisotropy in vertical wells.

Two important emerging markets make the removal of these shortcomings more urgent. The first emerging field is the increasing need for accurate well placement, which requires directional measurements to make steering decisions to place the borehole optimally in the reservoir. The second is the low resistivity pay in laminated formations where accurate identification and characterization of hydrocarbon reserves is not possible without knowing the resistivity anisotropy. Many recent patents disclose methods and apparatus to make directional measurements and obtain resistivity anisotropy. For logging while drilling applications, U.S. Pat. No. 5,508,616 to Sato et al. discloses an induction-type tool with two coils tilted at different directions not aligned with the tool's longitudinal axis. The directionality of the measurement is illustrated through a simple argument that the sensitivity function of the two tilted coils is concentrated towards the overlapping region of the sensitivity area of each coil. Through rotation of the tool, Sato et al claim that a deep azimuthal resistivity image of the formation can be obtained. However, this patent reference does not provide any details as to how the azimuthal resistivity can be obtained, nor does it describe any further boundary detection/characterization techniques required for quantitative geosteering decision-making.

U.S. Pat. No. 6,181,138 to Hagiwara and Song extends Sato et al's single fixed directional coils into co-located triple orthogonal induction coils at the transmitter and receiver location. No tool rotation is said to be required, since the focusing direction can be tuned to arbitrary orientation through linear combination of the orthogonal coil responses. It is not clear if there is a shield design that will allow the passing of all the required EM components without severe uncontrollable distortion of the wave form for "while drilling" applications.

U.S. Pat. No. 6,297,639 to Clark et al., assigned to the assignee of the present invention, discloses methods and apparatus for making directional measurements utilizing various shield designs to provide selected attenuation of EM wave energy for axial, tilted, and transverse antenna coils. This patent reference describes, among other things, general directional induction and propagation measurements with tilted coils and appropriate shields, along with a process for conducting borehole compensation for them which is non-trivial. A one-axial and one-tilted transmitter/receiver coil combination is explicitly described by Clark et al., along with its application for bed boundary direction detection by observing azimuthal variation of the induced signal as the tool rotates. The azimuthal variation of the coupling can be used for steering wells while drilling. More shield patents have since been granted, including U.S. Pat. No. 6,351,127 to Rosthal et al., and U.S. Pat. No. 6,566,881 to Omeragic et al, both of which are assigned to the assignee of the present invention.

U.S. Pat. No. 6,476,609 to Bittar extends an earlier anisotropy patent describing both transmitters and receivers possibly having a tilt angle, U.S. Pat. No. 6,163,155 also to Bittar, to the area of geosteering application. The bedding response of up/down tilted induction and propagation apparatus is described through the difference or ratio of signals at two different orientations, but no shielding is mentioned. Nor are the effects of anisotropy or dipping considered. Also lacking is a description of how to use these measurements to derive a precise distance to a formation bed boundary. The '609 patent implicitly assumes that bedding orientation is precisely known so as to calculate the up/down response. No technique, however, is disclosed to locate the precise up or down direction prior the calculation of the up-down directional signals.

U.S. patent application Publication No. 2003/0085707 to Minerbo et al, assigned to the assignee of the present invention, discloses tool configurations and symmetrization techniques that simplify the response of the directional measurements to the point that it becomes almost independent to anisotropy or dipping angle. Responses to bed boundary distance with different dip and anisotropy essentially overlap except near the bed boundary. Both two-coil (one transmitter and one receiver: "TR") induction style and three-coil (one transmitter and two receivers: "TRR") propagation-style measurements can be symmetrized to achieve this simplification. The symmetrization is done between two tilted TR pairs of the same spacing, but with the transmitter tilted angle and receiver tilted angle exchanged. Only cases where the magnetic moments of the transmitters and receivers are lying in the same plane is considered. This has a disadvantage of not being able to provide the required signal for geosteering all the time during sliding, which is the case for well placement with a mud motor during the angle build on the trajectory. If the magnetic moment of the tool happens to lie parallel to the bedding during sliding, the up/down directional signal generated will be zero independent of the distance to the boundary. Thus no monitoring of the distance to the boundary is possible.

U.S. patent application Publication No. 2003/0200029 to Omeragic et al, also assigned to the assignee of the present invention, discloses propagation-style directional measurements for anisotropy determination in near-vertical wells with borehole compensation. Inversion techniques are also used to obtain the anisotropic formation property. U.S. patent application Publication No. 2003/0184302 to Omeragic and Esmersoy, assigned to the assignee of the present invention, also discloses techniques for looking-ahead with directional measurements.

U.S. patent application Publications No. 2004/0046560A1 and 2004/0046561A1 to Itzkovicz et al, discloses the use of quadrupole antennas, and transverse dipolequadrupole coupling and induction style measurements with similar directional characteristics to a conventional cross-dipole XZ response. Practical realization on a metallic collar and adequate shielding of such antennas is not clear. Also, the borehole effect of such measurements and its interaction/coupling with the boundary effect may be different from XZ-style measurements.

None of the above patent references discloses the use of detailed azimuthal responses of the measured signal or techniques to extract such responses. These references further fail to teach how to use the directional measurement to arrive at boundary distances for geosteering use. Only the so-called up/down measurement, which is the difference in the measured signal between the tool focusing directly towards and away from the formation bed, is mentioned. The precise bedding dip and azimuth information is usually not known before the drilling, and they also frequently vary in challenging well placement situations where geosteering is required. Using a predefined bedding up/down direction produces at best degraded measurement and at worst can lead to wrong geosteering decisions when the bedding azimuth suddenly changes. In principle, the measurements can be binned azimuthally downhole. This technique has a number of drawbacks including difficulties in aligning the top and bottom bins precisely with the orientation of the formation bedding, and the inability to use (i.e., wasting) the data that are not in the up and down bins. The large memory required to record the azimuthal data with sufficient accuracy is also an issue.

More importantly, the existing art for geosteering using directional measurements works only for steering up and down. There are many cases where the wellbore has to move azimuthally to avoid exiting the pay zone.

A need therefore exists for methods and techniques of extracting and analyzing the azimuthal dependence of directional logging measurements, using measurements taken at all the azimuthal angles, for characterizing the earth formation and for steering wells during drilling with improved accuracy.

A need further exists for providing the bedding azimuth from the directional measurements, and generating measurements that can be used for well placement in up/down or azimuthal steering.

A need further exists for methods of utilizing these directional measurements in real-time to obtain bed boundary distances and to obtain accurate earth models such that a geosteering decisions can be made for well placement.

A need further exists for a method of detecting the presence of resistivity anisotropy in formation layers adjacent near-vertical wells.

A still further need exists for an efficient system that provides such directional measurements, analyzes them downhole, and transmits relevant information to surface to facilitate geosteering up/down or azimuthally during well placement. It would be further advantageous if such a system could provide distance-to-boundary information during the sliding phases of drilling (i.e., no drill string rotation) as well as when the system/tool is rotating.

DEFINITIONS

Certain terms are defined throughout this description as they are first used, while certain other terms used in this description are defined below:

"Convergence" means the condition when iteratively-calculated values approach observed values or finite limits as the number of iteration cycles increases.

"Crossplot" means a graph, or the creation of such a graph, that indicates the relationship between two different measurements of the same subject or sample.

"Inversion" or "invert" means deriving a model (a.k.a. "inversion model") from measured data (e.g., logging data) that describes a subsurface formation and is consistent with the measured data.

"Toolface" refers to the angular orientation of an instrument about its longitudinal axis, and represents an angle subtended between a selected reference on the instrument's housing (e.g., a drill collar) and either the gravitationally uppermost wall of the wellbore or geographic north.

"Symmetry" or "symmetric," as used herein, refers to a configuration in which sets of transmitter-receiver arrangements are provided in opposite orientations along the longitudinal axis of a tool, such that these transmitter-receiver sets can be correlated with a standard symmetry operation (e.g., translation, mirror plane, inversion, and rotation) with respect to a point on the tool axis or a symmetry plane perpendicular to the tool axis.

SUMMARY OF INVENTION

In one aspect, the present invention provides a novel on-the-fly data processing technique to extract signals from the azimuthal variation of the directional measurement that are relevant for formation characterization and geosteering use. Instead of placing logging data into azimuthal bins and then determining the values associated with up and down directions as is done in conventional imaging and proposed by others, the present invention takes advantage of the simplicity of the physics of the logging response. More particularly, the relevant boundary, anisotropy and fracture signals are extracted from the formation response through fitting of the azimuthal variation of the measured voltages to some sinusoidal functions. The orientation of the bedding is also obtained as a result. This on-the-fly processing improves the accuracy of the measurements because data in all azimuthal directions, or angles, are used and no quantization according to particular angles occurs. Such large processing is made possible with integer calculations in a digital signal processor (DSP), which also represents an innovation in the implementation.

By extracting the relevant voltage couplings according to their order of azimuthal dependence, the present invention allows for calculations of propagation style measurements with only one transmitter and receive pair. It also allows for superposition of measurements of different TR pairs of even different azimuthal orientation to generate other measurements of unique property, such as the symmetrized or anti-symmetrized measurements.

The present invention further provides an innovative measurement sequence to increase the tolerance to irregular rotation, harmonic binning, and even stick-slip. A rapid firing sequence is utilized, and this sequence is randomized at each acquisition cycle to reduce cyclic lock-up at particular rotational speeds.

Accordingly, the present invention may be expressed as a method for characterizing a subsurface formation, beginning with the step of disposing a suitable logging instrument within a borehole. The logging instrument is equipped with at least first transmitter and receiver antennas spaced apart by a first distance. At least one of the first antennas has a tilted magnetic dipole with respect to the longitudinal axis of the instrument. The first antennas are oriented about the axis of the logging instrument such that the at least one tilted magnetic dipole corresponds to a first azimuthal angle. The logging instrument is azimuthally-rotated within the borehole, e.g., by rotation of the drill collar or drill string tool containing the instrument. While the logging instrument is rotating, the first transmitter antenna is activated to transmit electromagnetic energy into the formation. Also, while the logging instrument is rotating, a set of first voltage signals associated with the transmitted electromagnetic energy using the first receiver antenna is directionally measured as a function of the azimuthal orientation of the logging instrument. The directional measurements determine the azimuthal variation of the measured first voltage signals. This azimuthal variation is fitted to approximate functions. The activating, measuring, and fitting steps may be repeated to execute subsequent acquisition cycles.

In a particular embodiment, the fitting step is executed while the first voltage signals are being measured and the fitting is stopped when convergence has been achieved. The fitting coefficients are preferably determined using a Fast Fourier Transform.

In a particular embodiment, the fitting functions are sinusoids defined by coupling components of the first transmitter antenna's magnetic dipole and first receiver antenna's orientation vectors. The coefficients of the fitting components are preferably functions of earth formation parameters including at least one of resistivity of formation beds, location of the logging instrument, borehole deviation, azimuth angle at the location of the logging instrument, and a combination thereof. The fitting coefficients preferably include constant, sin ϕ, cos ϕ, sin 2ϕ and cos 2ϕ terms that define an iterative fitting algorithm useful for determining the azimuthal dependence of the directional measurements.

As mentioned above, the present invention is adaptive to the superposition of measurements of different transmitter-receiver ("TR") pairs. Accordingly, in a particular embodiment, the logging instrument is further equipped with second transmitter antenna and receiver antennas spaced apart by the first distance. The second transmitter has a magnetic dipole whose tilt corresponds to the tilt of the first receiver antenna, and the second receiver antenna has a magnetic dipole whose tilt corresponds to the tilt of the first transmitter antenna, such that at least one of the second antennas has a tilted magnetic dipole. The second transmitter and receiver antennas are oriented about the axis of the logging instrument such that the at least one tilted magnetic dipole corresponds to a second azimuthal angle. Thus, while the logging instrument is rotating, the second transmitter antenna to transmit electromagnetic energy into the formation, and a second set of voltage signals associated with the transmitted electromagnetic energy are directionally measured using the second receiver antenna, as a function of the azimuthal orientation of the logging instrument. These directional measurements determine the azimuthal variation of the measured second voltage signals. As with the measured first voltage signals, the azimuthal variation of the measured second voltage signals are fitted to approximate functions.

In a particular embodiment, the second azimuthal angle differs from the first azimuthal angle by substantially 90 degrees. Alternatively, the second azimuthal angle may be substantially equal to the first azimuthal angle.

In a particular embodiment, the fitting functions are sinusoids defined by coupling components of the first transmitter antenna's magnetic dipoles and first receiver antenna's orientation vectors, and by coupling components of the second transmitter antenna's magnetic dipoles and second receiver antenna's orientation vectors. The coefficients of the fitting components are preferably functions of earth formation parameters such as resistivity of formation beds, location of the logging instrument, borehole deviation, and azimuth angle at the location of the logging instrument. The fitting coefficients preferably include constant, sin ϕ), cos ϕ, sin 2ϕ and cos 2ϕ terms that define an iterative fitting algorithm useful for determining the azimuthal dependence of the directional measurements. The measured first and second voltage signals are preferably complex voltage signals. Accordingly, in this embodiment, the inventive method further includes the steps of calculating the phase-shift and attenuation values from the fitting coefficients for the measured first and second voltage signals, and combining the calculated phase-shift and attenuation values for the measured first and second voltage signals to generate a symmetrized or anti-symmetrized measurement. The phase-shift and attenuation values can be obtained by taking the logarithm of the ratio of the complex voltage signals obtained from the fitting expression at two azimuthal angles, preferably azimuthal angles that are 0 and 180 degrees from a determined bedding azimuth.

In another aspect, the present invention provides for the characterization of noise in the directional measurements.

Thus, in embodiments wherein only one of the first antennas has a tilted magnetic dipole, the noise of the measured first and second voltage signals can be characterized using the second harmonic coefficients. In embodiments wherein each of the first antennas has one of a tilted and a transverse magnetic dipole, and the fitting coefficients include third harmonic coefficients, the noise of the measured first and second voltage signals can be characterized using the third harmonic coefficients. In still other cases, the noise of the first and second measured voltage signals can be characterized by combining the first and second measured voltage signals.

The present invention is also adaptive to conditions wherein the logging instrument is not being rotated, such as, e.g., during cessation of drill string rotation when directionally drilling with a mud motor assembly. Under such conditions, the second antennas are preferably symmetric with respect to the first antennas. The azimuth of a formation bed of interest is determined by combining the first and second antenna couplings (described above), and determining the constant and first harmonic coefficients from the measured first and second voltage signals acquired when the instrument is not rotating. The determined coefficients can then be used to execute the fitting step when the instrument is again rotating.

In another aspect, the present invention provides a method and system for using the extracted directional signals to obtain boundary distances and make geosteering decisions. The extracted directional signals are used to extract the distances to the boundary with two techniques. A simple cross-plot is used for simple one-boundary-scenario or known resistivity profile of the formation, while inversion techniques are used for more complex situations and to build consistent structure models. A two-dimensional cross plot encompasses measurements that are sensitive to resistivity and a measurement that is sensitive to distance, if shoulder resistivity is known. The alternative is to use cross-plot of two directional measurements to get the distance and resistivity of the shoulder for known bed resistivity. A three-dimensional cross-plot can also be generated for one boundary situation where each of the formation resistivity, shoulder resistivity, and distance to the boundary can be generated. The inversion technique uses multiple measurements to invert for different models and find the best match. The inversion can be done downhole or at the surface.

A Graphical User Interface (GUI) is part of the system for visualization of the formation model as well as the measurements and inversion results. The GUI facilitates interactive definition of inversion parameters, selection of measurements and models for improving the interpretation and generating consistent structure models. The iterative fitting algorithm preferably includes the steps of:

initialize $P_0$ and $U_0$;
for m = 1 to Nsamples $$P_m \leftarrow P_{m-1} - \frac{P_{m-1} \cdot r_{m-1}^T \cdot r_{m-1} \cdot P_{m-1}}{1 + r_{m-1} \cdot P_{m-1} \cdot r_{m-1}^T}$$

$$U_m \leftarrow U_{m-1} - P_m \cdot r_{m-1}^T \cdot (y_{m-1} - U_{m-1}^T \cdot r_{m-1}^T)^T;$$

next m;
return (U);

where: Nsamples is the total number of samples acquired in one cycle, M is the dimension of the approximate function vector (number of approximation functions), U is the vector of fitting coefficients of dimension a matrix of dimension M, r is the vector of approximate function values at each measure position of dimension M, and P is a matrix of dimension M×M.

In one embodiment, the iterative fitting algorithm determines if the fit error is below a pre-defined threshold, and if U converges to a value that is representative of the fitting coefficients.

In one embodiment, the iterative fitting algorithm employs an integer implementation. Preferably, the integer implementation is employed when the logging instrument is azimuthally-rotated at relatively high rates, and a significant number of response channels require fitting.

In one embodiment, the fitting coefficients are used to determine the orientation of a formation bed. The measured first and second voltage signals are preferably complex voltage signals. The orientation of the formation bed with respect to the azimuthal angle reference for each channel of directional measurement is determined according to:

$$\phi_{bed} = \tan^{-1}\left[\left|\frac{\tilde{C}_{1s}(\theta_T, \theta_R)}{\tilde{C}_{1c}(\theta_T, \theta_R)}\right|\right]$$

where $C_{1s}$ is the real or imaginary part of the coefficient of sin φ, and $C_{1c}$ is the coefficient of cos □ from the fitting. A common azimuthal angle for the first and second voltage signals can be calculated using weighted averaging of the fitting coefficients for real and imaginary parts of the measured voltage signals. The amplitude and phase of the measured voltage signal can be calculated at an assumed normal direction to a bed boundary of interest. Phase shift and attenuation can be determined by taking propagation measurements for two azimuth angles, e.g., $\phi_{bed}$ and $\phi_{bed}$+ 180°. The signals from the fitting coefficients for the first and second voltage measurements are preferably combined to produce signals necessary to determine the distance to bed boundaries of interest.

Other aspects of the present invention relate to formation characterization through the use of crossplots. One method includes the step of cross-plotting two directional logging measurements acquired from an instrument disposed in a borehole intersecting the formation to obtain a distance to at least one formation boundary and a resistivity for at least one formation bed. The cross-plotting is achieved using a one-boundary model. The obtained resistivity is the shoulder-bed resistivity, and the obtained distance is the closest distance to the shoulder-bed.

Another method includes the step of cross-plotting a resistivity and a directional measurement determined using an instrument disposed in a borehole intersecting the formation to obtain a distance to at least one formation boundary and a resistivity for at least one formation bed.

The cross-plotting is achieved using a one-boundary model. The obtained resistivity is the shoulder-bed resistivity, and the obtained distance is the closest distance to the shoulder-bed.

A further method includes the step of cross-plotting a resistivity and two directional measurements determined using an instrument disposed in a borehole intersecting the formation to obtain a distance to at least one formation boundary and a resistivity for at least two formation beds. The cross-plotting is achieved using a one-boundary model. The obtained resistivities are the bed and shoulder-bed resistivities, and the obtained distance is the closest distance to the shoulder-bed. The determined boundary distance and bed resistivity can be used to make drilling decisions.

Another aspect of the present invention relates to the use of an inversion technique to interpret the directional measurements for geosteering applications. Here, the iterative fitting algorithm is useful for selected real-time directional measurements having utility in geosteering. An appropriate inversion model is selected for the selected real-time directional measurements. Once the selected model is verified to be consistent with other information, it is used to make drilling decisions.

The model-selection step preferably includes running a plurality of models comprising model-types of: homogenous isotropic (single parameter: resistivity); homogenous anisotropic (two parameters: Rh and Rv); single boundary isotropic formation, boundary above or below (three parameters: Rbed, Rshoulder and distance to boundary); single boundary anisotropic formation, boundary above or below (four parameters: Rbed_h, Rbed_v, Rshoulder and distance to boundary); two boundary isotropic formation three parameters: (five parameters: Rbed, Rshoulder_up, Rshoulder_down and distance to boundary above and below the tool); and two boundary anisotropic formation three parameters: (six parameters: Rbed_h, Rbed_v, Rshoulder_up, Rshoulder_down and distance to boundary above and below the tool).

The model selection step preferably further includes creating a visualization of the selected directional measurements.

In a particular embodiment, the model-selection step includes identifying known formation parameters, interactively choosing the models with which to invert the selected directional measurements, and selecting the simplest model that fits the known information.

The model-verifying step includes comparing the selected model to known geological characteristics and other measured formation parameters, and updating the selected model if the selected model is not consistent with the known information.

The updating step includes refining the selected model based upon one of trends, prior knowledge, external information, and a combination thereof. Appropriate inversion parameters are selected, and ranges for the selected parameters are defined. The inversion model is preferably updated by adding more formation beds. Some of the real-time directional measurements can be re-weighted or eliminated, and the resulting real-time directional measurements re-inverted to the updated model.

The crossplotting methods according to the present invention preferably include defining an appropriate model, selecting appropriate directional measurements, inputting the selected measurements to the defined model to generate the cross-plot, and generating a visual representation of the cross-plot. The crossplot can be updated with further real-time measurements.

A still further aspect of the present invention relates to an apparatus for measuring characteristics of earth formations surrounding a borehole. The apparatus includes a logging instrument adapted for disposal within the borehole. The logging instrument has a longitudinal axis and is equipped with first and second transmitter-receiver antenna pairs. The first transmitter-receiver antenna pair includes a first transmitter antenna having a magnetic dipole oriented in a first direction with respect to the longitudinal axis of the logging instrument, and a first receiver antenna located a first distance away from the first transmitter antenna and having a magnetic dipole oriented in a second direction, the first and second directions being different. The magnetic dipoles of the first transmitter and receiver antennas define a plane that includes the longitudinal axis of the logging instrument. The second transmitter-receiver antenna pair include a second transmitter antenna having a magnetic dipole oriented in the second direction with respect to the longitudinal axis of the logging instrument, and a second receiver antenna located the first distance away from the second transmitter antenna and having a magnetic dipole oriented in the first direction. The magnetic dipoles of the second transmitter and receiver antennas define a plane that includes the longitudinal axis of the logging instrument. The apparatus further includes a toolface sensor for continuously indicating the azimuthal orientation of the logging instrument, and a controller for controlling the first and second transmitter-receiver antennas pairs so as to selectively transmit electromagnetic energy into the formation and measure the voltage signals associated with the transmitted electromagnetic energy as a function of the azimuthal orientation of the logging instrument.

In a particular embodiment, the second transmitter-receiver antenna pairs are oriented at a first azimuthal angle (e.g., 90 degrees) with respect to the first transmitter-receiver antenna pairs about the longitudinal axis of the logging instrument.

In various embodiments, the measured formation characteristics include resistivity, and earth formation geometry information such as dip, azimuth, and bed thickness.

The first and second directions are variable, and can, e.g., be substantially collinear with the longitudinal axis of the logging instrument or substantially 45 degrees from the longitudinal axis of the logging instrument.

In a particular embodiment, the first and second transmitter-receiver antenna pairs are located at the same physical positions on the logging instrument.

In a particular embodiment, each of the transmitters and receivers have transceiver capabilities.

The toolface sensor can employ magnetometers to indicate the azimuthal orientation of the logging instrument with respect to earth's magnetic north, or gravitation sensors to indicate the azimuthal orientation of the logging instrument with respect to the earth's gravity vector.

The inventive apparatus preferably further includes a CPU for processing the measured voltage signals within the borehole, a telemetry apparatus for transmitting the measured signals and CPU-processed results from the borehole to the surface, and a surface system for further processing measured signals together with other measurements to generate and display selected parameters of a consistent earth model.

BRIEF DESCRIPTION OF DRAWINGS

So that the above recited features and advantages of the present invention can be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting of its scope, for the invention may admit to other equally effective embodiments.

FIG. 5A is a schematic representation of a directional measurement logging tool having a TRR configuration that is insensitive to anisotropy at any dip angle, in accordance with one aspect of the present invention.

FIG. 5B shows plots of the directional propagation response for a three-layer formation using a logging tool according to FIG. 5A.

DETAILED DESCRIPTION

Figure 2A:
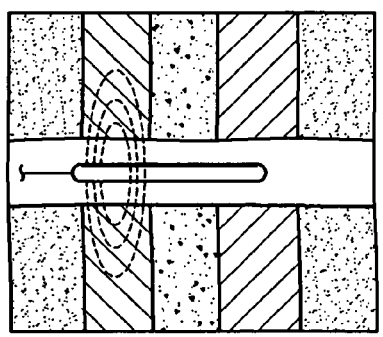
FIGS. 2A and 2B are elevational views showing eddy currents induced by a logging tool in a borehole penetrating a formation without and with a relative dip, respectively.
Figure 2B:
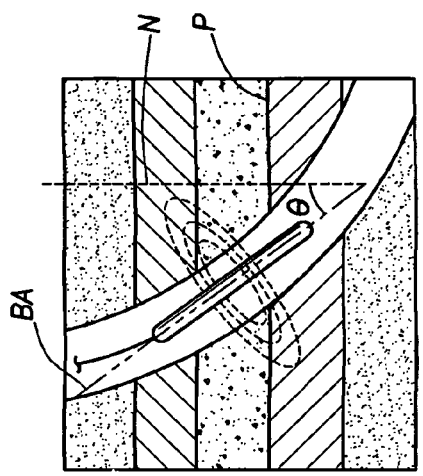
Figure 1:
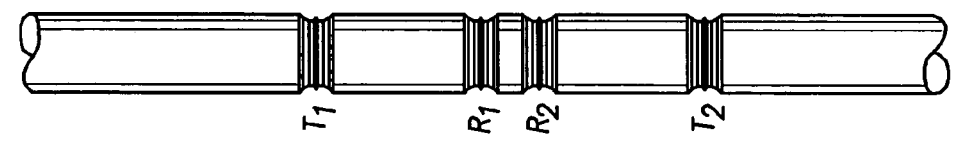
FIG. 1 shows schematic diagrams of prior art induction or propagation tools.
Figure 1:
Figure 3:
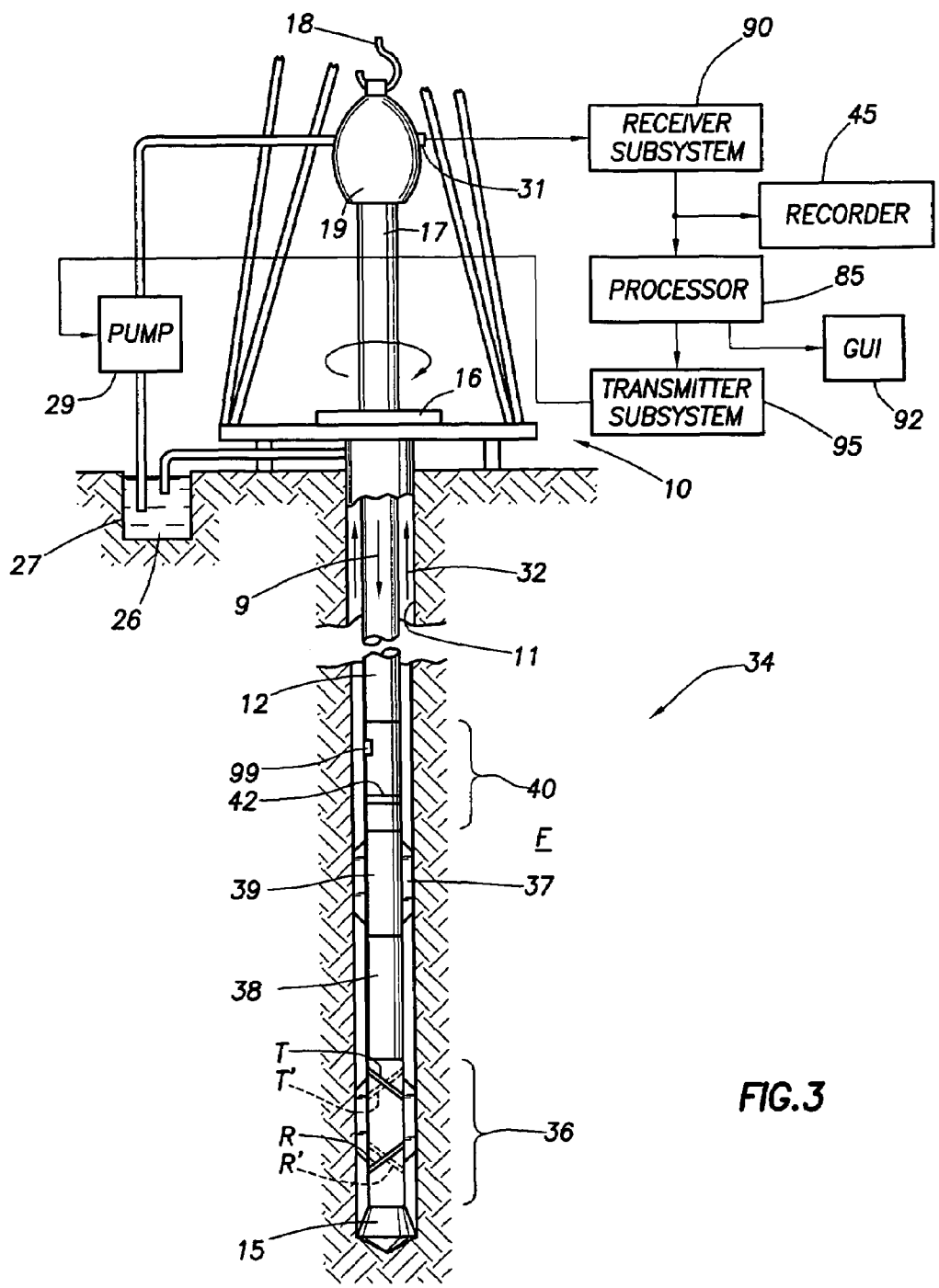
FIG. 3 is an elevational representation of a conventional rotary drilling string in which the present invention may be employed to advantage.

FIG. 3 illustrates a conventional drilling rig and drill string in which the present invention can be utilized to advantage. A land-based platform and derrick assembly 10 are positioned over a wellbore 11 penetrating a subsurface formation F. In the illustrated embodiment, the wellbore 11 is formed by rotary drilling in a manner that is well known. Those of ordinary skill in the art given the benefit of this disclosure will appreciate, however, that the present invention also finds application in directional drilling applications as well as rotary drilling, and is not limited to land-based rigs.

A drill string 12 is suspended within the wellbore 11 and includes a drill bit 15 at its lower end. The drill string 12 is rotated by a rotary table 16, energized by means not shown, which engages a kelly 17 at the upper end of the drill string. The drill string 12 is suspended from a hook 18, attached to a traveling block (also not shown), through the kelly 17 and a rotary swivel 19 which permits rotation of the drill string relative to the hook.

Drilling fluid or mud 26 is stored in a pit 27 formed at the well site. A pump 29 delivers the drilling fluid 26 to the interior of the drill string 12 via a port in the swivel 19, inducing the drilling fluid to flow downwardly through the drill string 12 as indicated by the directional arrow 9. The drilling fluid exits the drill string 12 via ports in the drill bit 15, and then circulates upwardly through the region between the outside of the drill string and the wall of the wellbore, called the annulus, as indicated by the direction arrows 32. In this manner, the drilling fluid lubricates the drill bit 15 and carries formation cuttings up to the surface as it is returned to the pit 27 for recirculation.

The drill string 12 further includes a bottomhole assembly, generally referred to as 34, near the drill bit 15 (in other words, within several drill collar lengths from the drill bit). The bottomhole assembly includes capabilities for measuring, processing, and storing information, as well as communicating with the surface. The bottomhole assembly 34 thus includes, among other things, a measuring and local communications apparatus 36 for determining and communicating the resistivity of the formation F surrounding the wellbore 11. The communications apparatus 36, also known as a resistivity tool, includes a first pair of transmitting/receiving antennas T, R, as well as a second pair of transmitting/receiving antennas T", R". The second pair of antennas T", R" are symmetric with respect to the first pair of antennas T, R, as is described in greater detail below. The resistivity tool 36 further includes a controller to control the acquisition of data, as is known in the art.

The BHA 34 further includes instruments housed within drill collars 38, 39 for performing various other measurement functions, such as measurement of the natural radiation, density (gamma ray or neutron), and pore pressure of the formation F. At least some of the drill collars are equipped with stabilizers 37, as are well known in the art.

A surface/local communications subassembly 40 is also included in the BHA 34, just above the drill collar 39. The subassembly 40 includes a toroidal antenna 42 used for local communication with the resistivity tool 36 (although other known local-communication means may be employed to advantage), and a known type of acoustic telemetry system that communicates with a similar system (not shown) at the earth's surface via signals carried in the drilling fluid or mud. Thus, the telemetry system in the subassembly 40 includes an acoustic transmitter that generates an acoustic signal in the drilling fluid (a.k.a., "mud-pulse") that is representative of measured downhole parameters.

The generated acoustical signal is received at the surface by transducers represented by reference numeral 31. The transducers, for example, piezoelectric transducers, convert the received acoustical signals to electronic signals. The output of the transducers 31 is coupled to an uphole receiving subsystem 90, which demodulates the transmitted signals. The output of the receiving subsystem 90 is then coupled to a computer processor 85 and a recorder 45. The processor 85 may be used to determine the formation resistivity profile (among other things) on a "real time" basis while logging or subsequently by accessing the recorded data from the recorder 45. The computer processor is coupled to a monitor 92 that employs a graphical user interface ("GUI") through which the measured downhole parameters and particular results derived therefrom (e.g., resistivity profiles) are graphically presented to a user.

An uphole transmitting system 95 is also provided fro receiving input commands from the user (e.g., via the GUI in monitor 92), and is operative to selectively interrupt the operation of the pump 29 in a manner that is detectable by transducers 99 in the subassembly 40. In this manner, there is two-way communication between the subassembly 40 and the uphole equipment. A suitable subassembly 40 is described in greater detail in U.S. Pat. Nos. 5,235,285 and 5,517,464, both of which are assigned to the assignee of the present invention. Those skilled in the art will appreciate that alternative acoustic techniques, as well as other telemetry means (e.g., electromechanical, electromagnetic), can be employed for communication with the surface.

Azimuthal Dependence of the Directional Measurement and the New Propagation-style Equivalent Two types of coil antennas are used to compose measurements with directional sensitivity. One type achieves its directional sensitivity by having the antenna either offset, e.g., from the center of a logging tool's longitudinal axis, or partially covered. Directional measurements can also be made with an antenna configured so that its magnetic moment is not aligned with the longitudinal axis of the tool carrying the antenna. The present invention relates to the second type of directionally-sensitive antenna.

Figure 4:
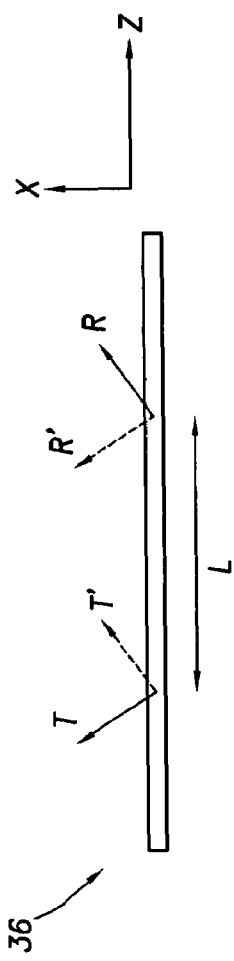
FIG. 4 is a schematic representation of a basic directional measurement logging tool having symmetrical transmitter and receiver antenna pairs.

FIG. 4 schematically illustrates a basic resistivity tool 36 for directional electromagnetic (EM) wave measurement. The tool 36 includes a transmitter antenna T that fires an EM wave of some frequency f and a receiver antenna R that is some distance L away. Also shown is the symmetric pair (T", R") in accordance with the teachings of U.S. patent application Publication No. 20003/0085707 ("Minerbo et al") assigned to the assignee of the present invention. For clarity and simplification, the discussion that follows will be limited to the transmitter antenna T and the receiver antenna R, although it is generally applicable to the symmetric antenna pair, T" and R". It should be noted that although the tiled moment of the two symmetrization pairs are on the same plane in FIG. 4, this is not required in the current invention. As will be clear in the subsequent discussion, signals from two pairs that have their moment in different planes can still be added together to achieve equivalent results if the extracted coefficients or directional phase-shift or attenuation are used in the symmetrization operation.

In operation, the receiver antenna R will register a voltage $V_{RT}$ induced by the EM wave from the transmitter antenna T and its secondary currents produced in the formation penetrated by the borehole containing the logging tool 36. Both antennas T and R are fixed on the tool 36 and thus rotate with the tool. The antenna orientations may be assumed to form angles $\theta_T$ for the transmitter antenna T, and $\theta_R$ for the receiver antenna R. The azimuthal variation of the coupling voltage as the tool rotates can then be expressed in terms of the coupling of Cartesian components of the magnetic dipoles as:

$$V_{nr}(\phi) = \left[V_{cc}\cos\theta_r\cos\theta_n + \frac{1}{2}(V_{rr} + V_{yy})\sin\theta_r\sin\theta_n\right] + \quad (1.1)$$
$$[V_{rc}\sin\theta_r\cos\theta_n + V_{cr}\cos\theta_r\sin\theta_n]\cos\phi +$$
$$[V_{yc}\sin\theta_r\cos\theta_n + V_{cy}\cos\theta_r\sin\theta_n]\sin\phi +$$
$$\left[\frac{1}{2}(V_{yr} + V_{ry})\sin\theta_r\sin\theta_n\right]\sin2\phi +$$
$$\left[\frac{1}{2}(V_{rr} - V_{yy})\sin\theta_r\sin\theta_n\right]\cos2\phi$$
$$= C_0(\theta_r, \theta_n) + C_{1c}(\theta_r, \theta_n)\cos\phi + C_{1c}(\theta_r, \theta_n)\sin\phi +$$
$$C_{1c}(\theta_r, \theta_n)\cos2\phi + C_{1c}(\theta_r, \theta_n)\sin2\phi$$

where a set of complex coefficients $C_0, C_{1c}, C_{1s}, C_{2c}, C_{2s}$ has been defined to represent the amplitudes of the different components of the measured formation response. The complex coefficients are thus defined as:

$$C_0(\theta_r, \theta_n) \equiv \left[V_{\alpha}\cos\theta_r\cos\theta_n + \frac{1}{2}(V_{rr} + V_{yy})\sin\theta_r\sin\theta_n\right] \quad (1.2)$$

$$C_{1c}(\theta_r, \theta_n) \equiv [V_{rc}\sin\theta_r\cos\theta_n + V_{cr}\cos\theta_r\sin\theta_n]$$

$$C_{1c}(\theta_r, \theta_n) \equiv [V_{sc}\sin\theta_r\cos\theta_n + V_{cy}\cos\theta_r\sin\theta_n]$$

$$C_{1c}(\theta_r, \theta_n) \equiv \left[\frac{1}{2}(V_{rr} - V_{yy})\sin\theta_r\sin\theta_n\right]$$

$$C_{1c}(\theta_r, \theta_n) \equiv \left[\frac{1}{2}(V_{yr} - V_{ry})\sin\theta_r\sin\theta_n\right]$$

According to one aspect of the present invention, it is recognized that these coefficients are functions of formation resistivity, borehole deviation, and azimuth angle at the tool location.

With a symmetrization operation, i.e., $(\theta_T \Leftrightarrow \theta_R)$

,Eq. (1.1) is simplified to:

$$\tilde{V}(\phi) = V_{RT}(\phi, \theta_T, \theta_R) - V_{RT}(\phi, \theta_R, \theta_T) \quad (1.3)$$
$$= 2[V_{xc} - V_{cx}]\sin(\theta_T - \theta_R)\cos\phi + 2[V_{yc} - V_{cy}]\sin(\theta_T - \theta_R)\sin\phi$$
$$\equiv \tilde{C}_{1c}(\theta_T, \theta_R)\cos\phi + \tilde{C}_{1s}(\theta_T, \theta_R)\sin\phi$$

All the second-order harmonics ($C_{2c}$, $C_{2s}$) disappear after the subtraction because they are symmetric with respect to the exchange of transmitter and receiver tilt angles. Thus anti-symmetrization simplifies azimuthal variation of the anti-symmetrized signal.

At this stage, the reference point of the azimuthal angle is arbitrary. For planner geometry, if we choose angle $\phi$ reference point as the direction normal to the bedding plane, then $V_{yz}=V_{zy}=0$ by symmetry and $\tilde{V}(\phi)$ would have a pure $\cos\phi$ dependence. In actual application, the orientation of the bedding is unknown. However, given any reference, the bedding orientation can be calculated by:

$$\phi_{bed} = \tan^{-1}\left[\left|\frac{\tilde{C}_{ls}(\theta_T, \theta_R)}{\tilde{C}_{1c}(\theta_T, \theta_R)}\right|\right] = \tan^{-1}\left[\left|\frac{V_{yc} - V_{cy}}{V_{xc} - V_{cx}}\right|\right] \quad (1.4)$$

With rotation $\phi_{bed}, \hat{x}$ will be normal to the bedding and thus $\tilde{V}(\phi)$ is exactly $[V_{XZ}-V_{ZX}]$ aside from a multiplication constant $2\sin(\theta_T-\theta_R)$ Once the voltage at each of the receiver coils due to each of the transmitter coils is determined, the total measurement can be determined: by adding the voltages in the case of an induction tool; or by taking the complex ratio of the voltages in the case of a propagation tool. For example, for the propagation logging device of FIG. 4, the absolute value of the voltage at each receiver can be obtained as the square root of the sum of squares of the real and imaginary parts of the complex voltage (Eq. 1.1), and the ratio of the absolute values provides the attenuation, from which the attenuation-determined resistivity $R_{ad}$ can be obtained (resistivity of formations at a relatively deep depth of investigation around the receivers). The phase for each receiver is obtained from the arc-tangent of the ratio of the imaginary and real parts of the complex voltage, and the phase shift is the difference in phase at the two receivers. The phase-shift-determined resistivity $R_{ps}$ can then be obtained (resistivity of formations at a relatively shallow depth of investigation around the receivers).

For propagation-style measurements, the difference of the logarithmic of the voltages (or the ratio) between two measurements is taken. Following the teachings of Minerbo et al, we take the amplitude of the azimuthal response, i.e., the difference in phase-shift and attenuation of measurement, at angle $\phi$ and that at ($\phi$+180), evaluated at the maximum of the voltage response. This leads to approximately, from Eqs. (1.1-2

$$\frac{V_{RT}(\phi)}{V_{RT}(180+\phi)} = \frac{\begin{array}{c}C_0(\theta_T,\theta_R)+C_{1c}(\theta_T,\theta_R)\cos\phi+C_{1s}(\theta_T,\theta_R)\sin\phi+\\ C_{2c}(\theta_T,\theta_R)\cos2\phi+C_{2s}(\theta_T,\theta_R)\sin2\phi\end{array}}{\begin{array}{c}C_0(\theta_T,\theta_R)-C_{1c}(\theta_T,\theta_R)\cos\phi-C_{1s}(\theta_T,\theta_R)\sin\phi+\\ C_{2c}(\theta_T,\theta_R)\cos2\phi+C_{2s}(\theta_T,\theta_R)\sin2\phi\end{array}} \quad (1.5)$$

$$\cong 1+2\frac{C_0(\theta_T,\theta_R)+C_{1c}(\theta_T,\theta_R)\cos\phi+C_{1s}(\theta_T,\theta_R)\sin\phi}{C_0(\theta_T,\theta_R)+C_{2c}(\theta_T,\theta_R)\cos2\phi+C_{2s}(\theta_T,\theta_R)\sin2\phi}$$

$$\cong 1+2\frac{\begin{array}{c}[V_{xz}\sin\theta_T\cos\theta_R+V_{zx}\cos\theta_T\sin\theta_R]\cos\phi+\\ [V_{yz}\sin\theta_T\cos\theta_R+V_{zy}\cos\theta_T\sin\theta_R]\sin\phi\end{array}}{\begin{array}{c}V_{zz}\cos\theta_T\cos\theta_R+\frac{1}{2}[V_{xx}+V_{yy}]\sin\theta_T\sin\theta_R+\frac{1}{2}[[V_{yx}+V_{xy}]\\ \sin\theta_T\sin\theta_R\sin2\phi+\frac{1}{2}[[V_{xx}-V_{yy}]\sin\theta_T\sin\theta_R\cos2\phi\end{array}}$$

The maximum of

|V| is achieved at $\phi$=0 if x is chosen to be the direction normal to the bedding. Evaluated at the angle $\phi$=0, Eq. (1.5) produces:

$$\frac{V_{RT}(0)}{V_{RT}(180)} \cong 1+2\frac{C_0(\theta_T,\theta_R)+C_{1c}(\theta_T,\theta_R)}{C_0(\theta_T,\theta_R)+C_{2c}(\theta_T,\theta_R)} \quad (1.6)$$

$$\cong 1+2\frac{[V_{xz}\sin\theta_T\cos\theta_R+V_{zx}\cos\theta_T\sin\theta_R]}{V_{zz}\cos\theta_T\cos\theta_R+V_{xx}\sin\theta_T\sin\theta_R}$$

This, however, is still not the pure xz-zx type of responses that are desired, i.e., which are insensitive to bedding anisotropy and dip angle.

The present invention relates to directional measurements that are insensitive to anisotropy of the formation at a wide range of dip angles and over a wide frequency range. As mentioned above, particular embodiments of the invention are based on anti-symmetrized antenna configurations or systems. Now with a symmetrization procedure $(\theta_T \Leftrightarrow \theta_R)$ as prescribed by Minerbo et al, we have:

$$\frac{V_{RT}(0,\theta_T,\theta_R)}{V_{RT}(180,\theta_T,\theta_R)} - \frac{V_{RT}(180,\theta_R,\theta_T)}{V_{RT}(0,\theta_R,\theta_T)} \cong \quad (1.7)$$

$$1+2\frac{[V_{xc}-V_{cx}]\sin(\theta_T-\theta_R)}{V_{zz}\cos\theta_T\cos\theta_R+V_{xx}\sin\theta_T\sin\theta_R}$$

This again is similar to the response of the induction type, although the denominator still has some components that are not simply [xz-zx]. This proves that the symmetrization procedure for propagation style measurement can produce responses similar to that of the symmetrized induction type, but not a pure type. It is also true that propagation measurement can be done at two arbitrary orientations in the azimuthal response.

The final response of this analysis contains components from different types of couplings, which at first seems undesirable in light of conventional logging techniques. However, this response enables an improved method of making the propagation measurement that is simple and is much closer to the induction type. The inventive directional measurement is achieved by observing that different types of couplings naturally separate into different azimuthal dependences. Note that we can use $C_0$, $C_{1c}$, $C_{1s}$ to make a cleaner directional measurement.

A determined bedding orientation $\phi_{bed}$ may be assumed through Eq. (1.4), such that all of the angles $\phi$ and $\hat{x}, \hat{y}$ are referenced through this direction. In this case, Eq. (1.1) simplifies to:

$$V_{RT}(\phi) = \left[V_{cc}\cos\theta_T\cos\theta_R + \frac{1}{2}(V_{xx}+V_{yy})\sin\theta_T\sin\theta_R\right] + \quad (1.8)$$

$$[V_{xc}\sin\theta_T\cos\theta_R + V_{cx}\cos\theta_T\cos\theta_R]\cos\phi +$$

$$\left[\frac{1}{2}(V_{xx}+V_{yy})\sin\theta_T\sin\theta_R\right]\cos2\phi$$

$$\equiv \overline{C}_0(\theta_T,\theta_R) + \overline{C}_{1c}(\theta_T,\theta_R)\cos\phi + \overline{C}_{2c}(\theta_T,\theta_R)\cos2\phi$$

Then a propagation measurement can be simply defined through $$\frac{\overline{C}_0(\theta_T,\theta_R) + \overline{C}_{1c}(\theta_T,\theta_R)}{\overline{C}_0(\theta_T,\theta_R) - \overline{C}_{1c}(\theta_T,\theta_R)} \quad (1.9)$$

and $$\frac{\overline{C}_0(\theta_T,\theta_R) + \overline{C}_{2c}(\theta_T,\theta_R)}{\overline{C}_0(\theta_T,\theta_R) - \overline{C}_{2c}(\theta_T,\theta_R)}$$

Now with symmetrization the first expression is obtained as:

$$\frac{\overline{C}_0(\theta_T,\theta_R)+\overline{C}_{1c}(\theta_T,\theta_R)}{\overline{C}_0(\theta_T,\theta_R)-\overline{C}_{1c}(\theta_T,\theta_R)} \cdot \frac{\overline{C}_0(\theta_R,\theta_T)+\overline{C}_{1c}(\theta_R,\theta_T)}{\overline{C}_0(\theta_R,\theta_T)-\overline{C}_{1c}(\theta_R,\theta_T)} \cong \quad (1.10)$$

$$1+2\frac{[V_{xz}-V_{zx}]\sin(\theta_T-\theta_R)}{V_{zz}\cos\theta_T\cos\theta_R+\frac{1}{2}[V_{xx}+V_{yy}]\sin\theta_T\sin\theta_R}$$

which is only slightly different from Eq. (1.7).

Thus, for both induction and propagation type of twocoil (TR) measurements, the analysis of the different component should be done on the voltage $V_{RT}(\phi)$ level. This produces the exact $\sin \phi$, $\cos \phi$, $\sin 2\phi$, and $\cos 2\phi$ behaviors that can be extracted through a novel-processing algorithm described in the next section.

It should again be noted that in special cases when either $$\theta_T = 0 \text{ or } \theta_R = 0$$

both the $\sin 2\phi$ and $\cos 2\phi$ terms vanish. The voltage dependence is simply based upon the $\sin \phi$ and $\cos \phi$ terms.

One important aspect of the propagation style measurements of phase-shift and attenuation is that it is naturally suited for "while drilling" measurements, for which detailed characterization of thermal electronics drift under downhole conditions is difficult to achieve. The directional phase-shift and attenuation measurements defined herein have the benefit of a traditional borehole-compensated propagation resistivity tool: the transmitter and receiver antenna characteristic and the drift of the receiver electronics are all dropped out of the measurement.

It should also be noted that in this invention the symmetrization process is done with the extracted coefficients which can be processed independently of the actual relative azimuth of the two TR pairs. If the TR pair orientation is physically rotated to an additional angle $\phi_0$ around the tool axis, the response is described with exactly the same expression except that $\phi$ is replaced by $$\phi \rightarrow \phi + \phi_0$$

This has important implications to the actual coil configurations. By using two pairs of TR measurements, but with different azimuthal orientations, the symmetrization process during rotation can be done exactly as if the two pairs are on the same plane. However, when the tool is sliding, the measured signal from the two orientations can be used to construct the required directional measurements by simply assuming the azimuth of the tool and the bedding did not change from the last time when the tool is still rotating. Thus, we can use Eq. 1.3 to obtain the amplitude C1c and C1s required to construct the propagation measurements.

These analyses can be extended straightforwardly to the traditional TRR type of measurements, as described in Minerbo et al. One skilled in the art can easily show that this procedure produces essentially the same response as indicated above, but with twice the signal when the spacing between the receiver pair is much smaller comparing with the TR spacing. The directional signals from the two receivers simply add.

FIG. 5A shows a TRR configuration that is insensitive to anisotropy at any dip angle, and FIG. 5B shows responses according to this configuration. The transmitter antenna T1 is energized and the phase shift and attenuation from the receiver antennas R11, R12 is measured. Then, the transmitter antenna T2 is energized and the phase shift and attenuation from the receiver antennas R21, R22 is measured. The tool reading corresponds to the differences between these two sets of measurements. Since the individual measurements are identical in a homogeneous medium at any angle and with any anisotropy, the tool readings is zero in a homogenous medium at any dip.

The measurement responses in a three-layer anisotropic formation are shown in FIG. 5B. The tool reading is zero far from the boundary at any dip, and there is little sensitivity to anisotropy close to the boundary. Separation in responses comes from the fact that propagation responses are not symmetric if the transmitter and receiver location are interchanged. Making an up/down measurement contains only the directional information, even close to the boundary. It should be observed that attenuation responses are practically overlapping for different dip if all antennas are in the same medium, similarly to ideal XZ-ZX induction measurement (described above). The phase shift measurements are also overlapping, although responses are double-valued in the conductive bed (1 S/m).

Figure 6:
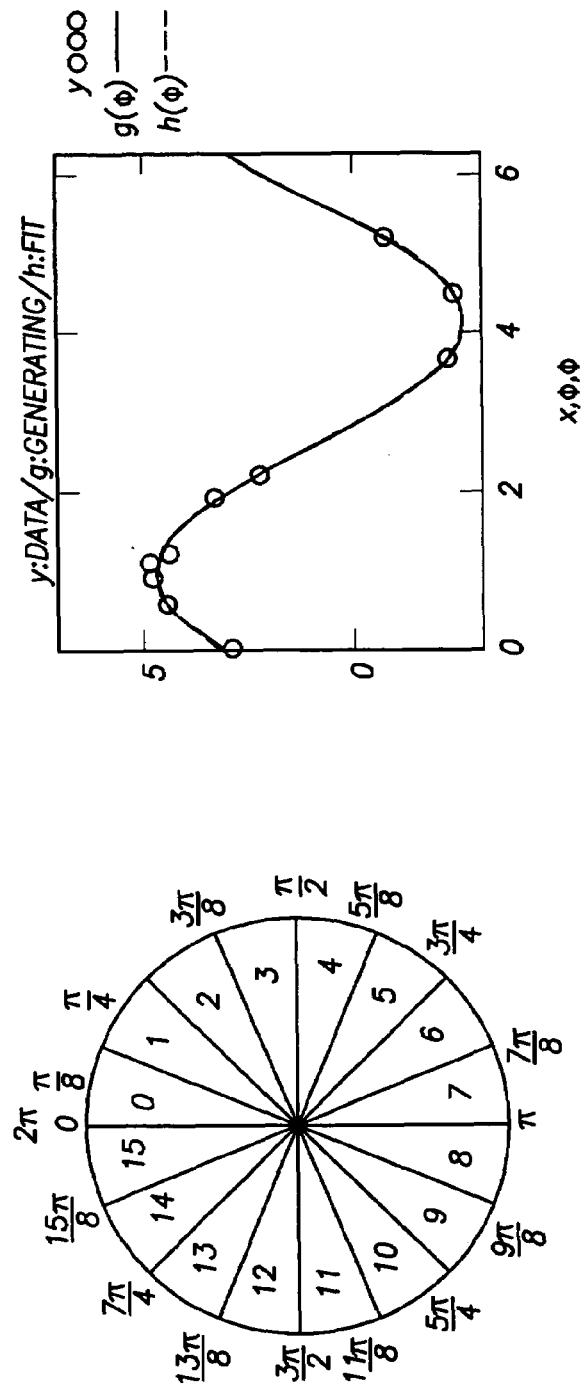
FIG. 6 shows a graphical comparison of a binning technique and an on-the-fly fitting technique according to one aspect of the present invention.

Digital Signal Processor (DSP) Algorithms to Extract the Signal from the Azimuthal Dependence It is clear from the previous analysis that the best way to extract the directional measurements is to analyze the voltage signals and extract the relevant measurements and then synthesizes them with symmetrization for final use with geosteering. The traditional method to deal with azimuthal data is to bin them into small bins of equal azimuthal span (see left portion of FIG. 6), as was done with resistivity or density borehole images. Then, the up and down bins could be identified by locating the maximum and minimum. However, there are many disadvantages of this technique:

1. binning reduces the angle resolution of the measurement;

2. binning results in wasted data since none of the data outside the up and down bins is used for distance-to-boundary calculation;

3. in stick and slip occurrences, binning is not uniform and thus the up and down bins may be empty or have small samples, thus inducing error in the up/down measurements and possibly producing the wrong identification of peak values in the worst case;

4. binning consumes more memory.

One aspect of the present invention is principally concerned with determining the coefficients of the $\sin \phi$, $\cos \phi$, $\sin 2\phi$ and $\cos 2\phi$ terms, which define a new algorithm to be used instead of conventional binning. This inventive technique is referred to as "on-the-fly" fitting of the azimuthal response according to extracts of the relevant sin and cos terms of the directional measurements, taken iteratively (see plotted points of FIG. 9). Such a fitting algorithm is done in a DSP through an integer algorithm so it is fast enough to be performed for all channels within the 4-ms of sampling time. The precise use of azimuth angle information, and the randomization of the acquisition sequences, makes the algorithm robust to tolerate irregular tool rotation as well as stick-and-slip under rough drilling conditions. This way, all the data are used to obtain the up/down signal instead of only the data in the two bins, thus improving the signal-to-noise ratio in the measurement. The use of precise azimuth angles also makes the determined bedding orientation more precise.

The detail algorithm can be described as follows.

Floating point implementation: starting with an initial value of matrix $P_0$ and vector $U_0$, then proceeding to the algorithm described below (also represented graphically in the right-hand portion of FIG. 6) with measurement $y(\phi_1)$ and basis $\gamma = (1 \cos \phi_1 \sin \phi_1 \cos 2\phi_1 \sin 2\phi_1)^r$, where P is a matrix of dimension M×M and U and r are vectors of dimension M. M is the dimension of the basis function. After iteration $N$, then U will converge to a value which represents the coefficients of the expression. This algorithm is stable and convergence is usually achieved within 10-15 iterations. The detailed algorithm is shown below:

initialize $P_0$ and $U_0$;
for m = 1 to Nsamples $$P_m \leftarrow P_{m-1} - \frac{P_{m-1} \cdot r_{m-1}^T \cdot r_{m-1} \cdot P_{m-1}}{1 + r_{m-1} \cdot P_{m-1} \cdot r_{m-1}^T}$$

$$U_m \leftarrow U_{m-1} - P_m \cdot r_{m-1}^T \cdot (y_{m-1} - U_{m-1}^T \cdot r_{m-1}^T)^T;$$

next m;
return(U);

where:
Nsamples is the total number of samples acquired in one cycle,
M is the dimension of the approximate function vector (number of approximation functions),
U is the vector of fitting coefficients of dimension$^M$,
y is the vector of approximate function values at each measure position of dimension$^M$, and
P is a matrix of dimension$^{M \times M}$.

Integer Algorithms in DSP In many cases, floating point implementation will be too expensive to perform with presently available downhole cpu's because there may be hundreds of channels to be fitted and the data acquisition for each azimuth angle has to be quite short (ms) in order for the angle to be accurate at higher rotation speed. In this situation, an integer implementation can be applied, with some modification, to improve accuracy (e.g., use 32-bits for multiplication), perform rescaling to avoid overflow, and to accelerate convergence. The values of the basis function can also be pre-generated and stored in memory so as to be interpolated later to obtain the value for the true angle $\phi_1$.

In summary, the integer algorithms are:
based on 16-bit integer data representation with 32-bit integer intermediate variables;
more efficient but less precise;
adaptive to strategies for improving accuracy and speed of convergence: scaling, initialization and re-initialization;
adaptive to strategies to adapt to DSP environment: division, rounding.

Figure 7:
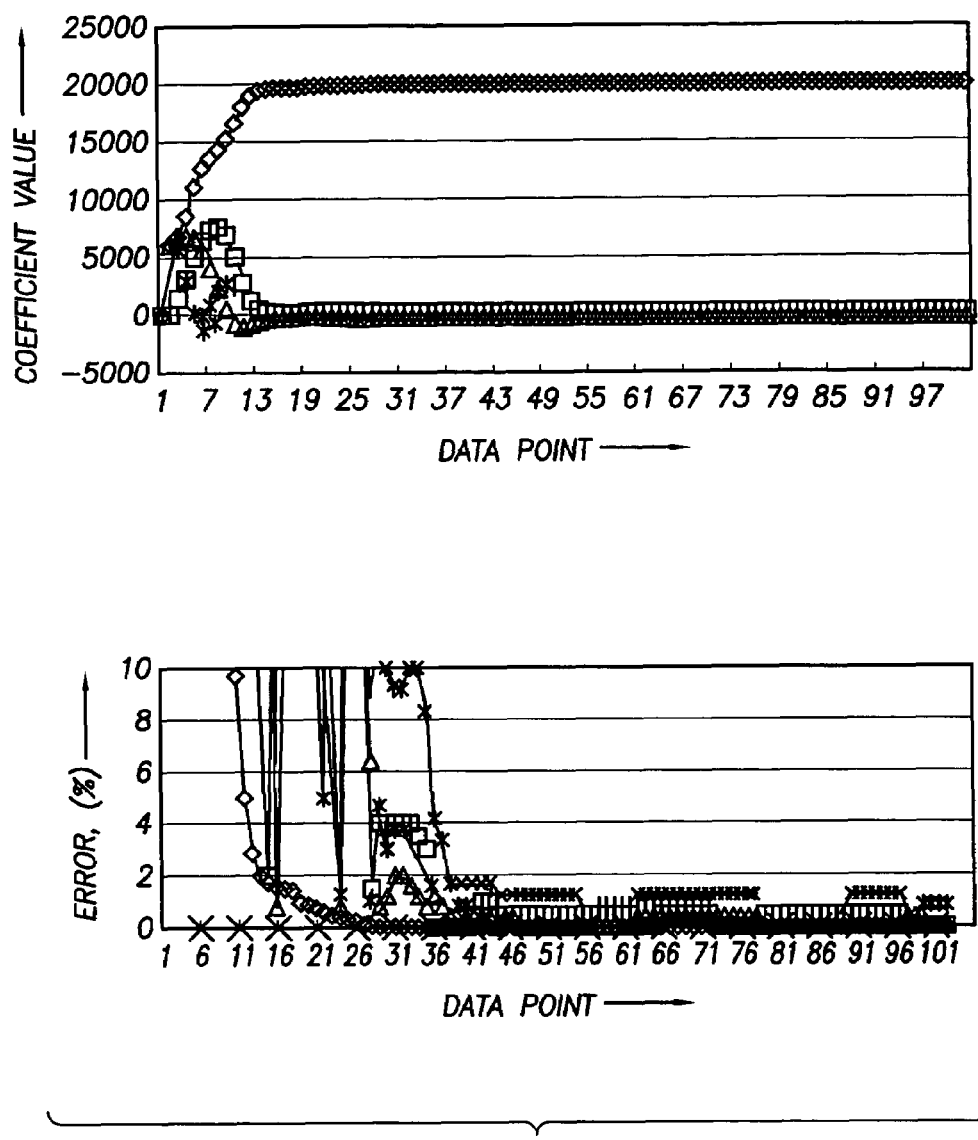
FIG. 7 shows plots representing the convergence and error in a target coefficient set resulting from a fitting technique according to one aspect of the present invention, as implemented through an integer algorithm in a digital signal processor in accordance with another aspect of the present invention.

A convergence flow of the integer version of the algorithm is shown in FIG. 7. It should be noted that the fitting is quite accurate with errors generally less than 1%. A very important point of the fitting is that almost all the data are used to derive the coefficients (directional measurement signals), thus improving significantly the signal-to-noise ratio. For example, if 32 bins are used, then only 1/16 of data are used if the up/down binning is implemented. Using on-the-fly fitting, in contrast, almost all the data are taking into account (aside from the initial convergence part).

Since only the relevant signals are extracted in the fitting technique (described above), only the useful coefficients need to be saved. Thus, in this case, it's only necessary to save 5 coefficients, as compared to 32 if one were to bin all the data using the 32-bin example. Those skilled in the art will appreciate the advantages of the inventive technique which include the accuracy of the extracted signal and a particular improvement in the accuracy of the azimuthal angle.

In another aspect, the present invention provides for the characterization of noise in the directional measurements. Thus, in embodiments wherein only one of the first antenna pair (TR) has a tilted magnetic dipole, the noise of the measured voltage signals can be characterized using the second harmonic coefficients. In embodiments wherein each of the first antennas has either a tilted or a transverse magnetic dipole, and the fitting coefficients include third harmonic coefficients, the noise of the measured voltage signals can be characterized using the third harmonic coefficients. In still other cases, the noise of the measured voltage signals can be characterized by combining the signals.

The present invention is also adaptive to conditions wherein the logging instrument is not being rotated, such as, e.g., during cessation of drill string rotation when directionally drilling with a mud motor assembly. Under such conditions, the second antenna pair (T"R") is preferably symmetric with respect to the first antenna pair. The azimuth of a formation bed of interest is determined by combining these antenna couplings (as described above), and determining the constant and first harmonic coefficients from the measured voltage signals acquired when the instrument is not rotating. The determined coefficients can then be used to execute the iterative fitting when the logging instrument is again rotating.

Boundary Distance for Geosteering Use According to another aspect of the present invention, the determined coefficients can be used to obtain the orientation of the formation bedding. For each channel of directional measurements, the orientation of the bedding can be determined through Eq. 1.4. It may be further noted that the average value from many channels, weighted by a function of the relative signal strength of each channel that comprise a measurement, can also be used to increase accuracy since this orientation should be the same for all channels. The amplitude and the phase of the voltage signal $$V_{RT(\phi bed)}$$

at the assumed normal direction to the bed can then be calculated.

The directional phase-shift and attenuation can be calculated with Eq. 1.10. Symmetrization is then performed to produce the final signal needed to find the distance to the boundary. It should be appreciated, however, that the order of these steps can be varied with similar or identical responses.

Figure 8:
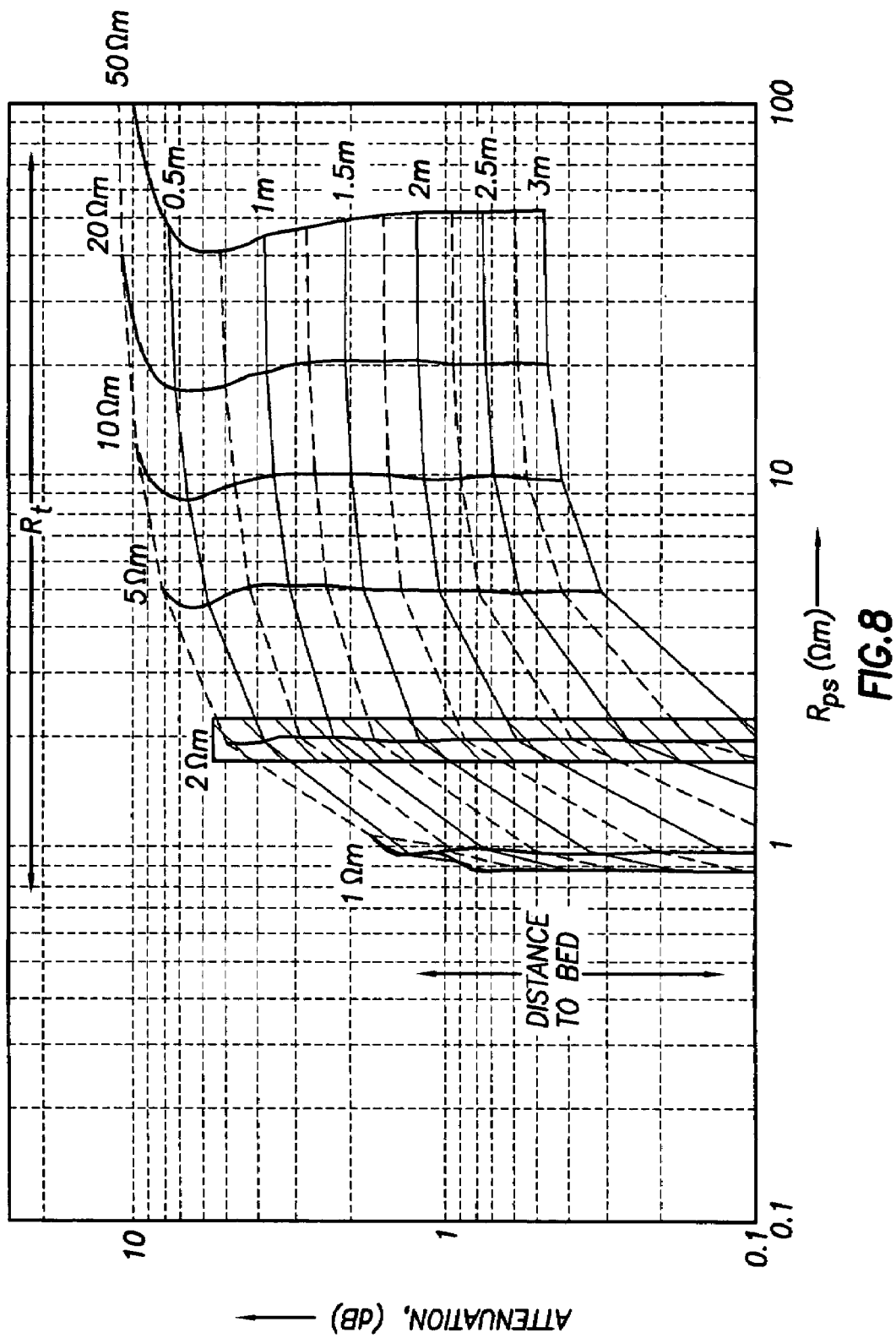
FIG. 8 shows a cross-plot chart representing a conversional resistivity measurement and a directional measurement as used to obtain the resistivity of a formation bed and the distance to the bed boundaries, for a known shoulder-bed resistivity.

To obtain the boundary distance in real-time, two techniques can be employed. For simple models (one boundary only), a cross-plot of two directional measurements enables us to get both the distance to the boundary and the formation resistivity of one of the beds. A representative cross-plot chart is shown in FIG. 8, using the response of an 84 inch, 100 kHz attenuation versus a 28 inch, 2 MHz phase shift resistivity (shoulder resistivity being $R_h$=0.8 $\Omega$m, $R_v$=3.$\Omega$m). Here, symmetrization effectively removes other parameters such as anisotropy and dipping from the consideration. The charts for symmetrized measurement are simple. The use of different combinations of pair measurements to obtain a consistent picture will increase the confidence of the interpretation.

Figure 9:
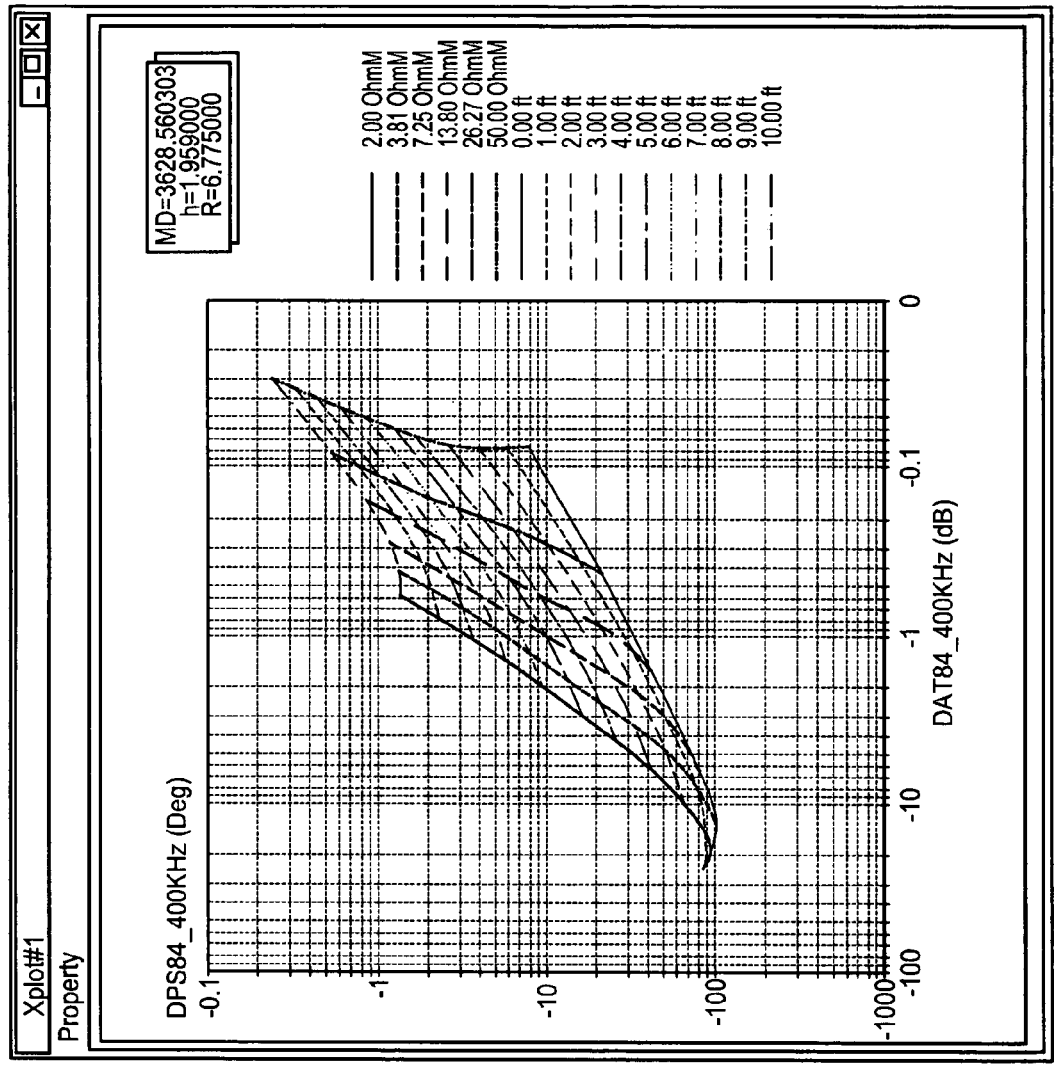
FIG. 9 shows the results of an inversion technique applied to obtain the resistivity and point-by-point boundary locations of a formation bed.

FIG. 9 illustrates the use of cross-plot based inversion to interpret the directional measurements. Two directional 84 inch 400 kHz measurements are used to interpret the measurements using a single boundary model with fixed bed resistivity at 100 $\Omega$m, and varied shoulder bed resistivity (below the tool) and distance. The response is not sensitive to bed resistivity, and signal is primarily determined by the shoulder-bed resistivity and distance. The dots plotted on the captured screen image indicate shoulder-bed resistivity measurements and distance readings. The value of resistivity and distance are read from the cross-plot and output on the screen.

For the one-bed boundary case where the resistivities of the beds on both sides of the boundary are known, one can use three inputs, at least one of which is a measurement of the resistivity surrounding the tool (e.g., tool 36 in FIG. 3).

For more complex models involving more boundaries, an inversion program based on the disclosed technique of U.S. Pat. No. 6,594,584 is employed. A trajectory of the borehole is projected onto an initial model of the formation. A logging tool is disposed within a segment of the borehole trajectory, and its responses along the segment are measured. The expected responses of the tool, according to the model, are also determined. Differences resulting from a comparison between the expected and the measured responses along the segment are then used to adjust the model, and the cycle of comparing and adjusting are repeated until the differences fall below a selected threshold. The robustness of the inversion model is improved with multiple starting points and physical criteria to distinguish between solutions.

Figure 10A:
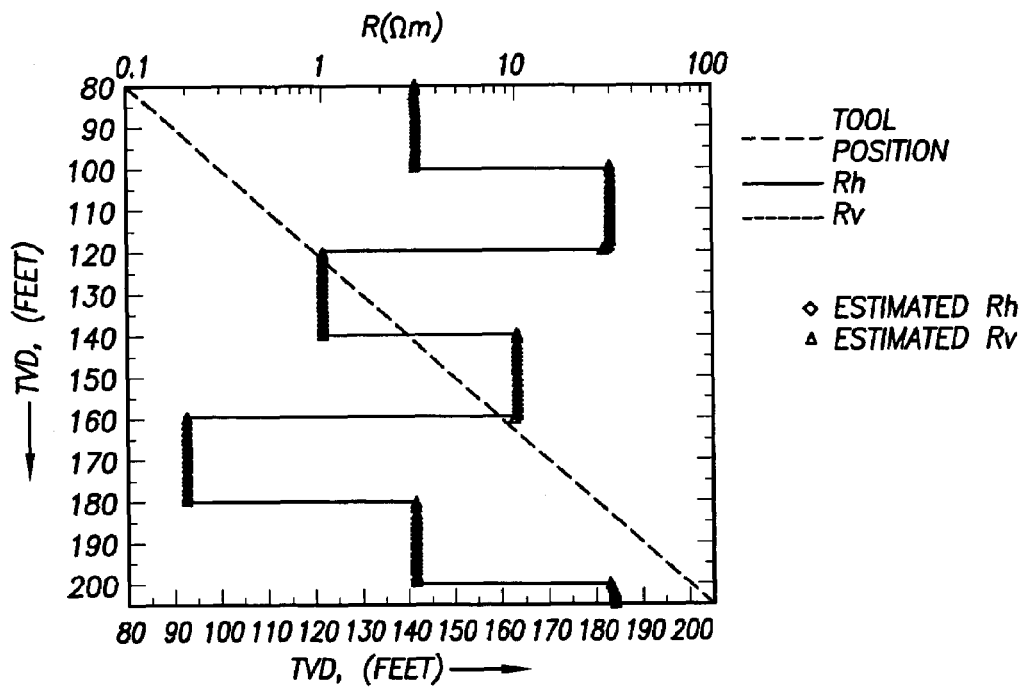
FIG. 10 shows a cross-plot-based inversion technique applied to interpret the directional resistivity measurements.
Figure 10B:
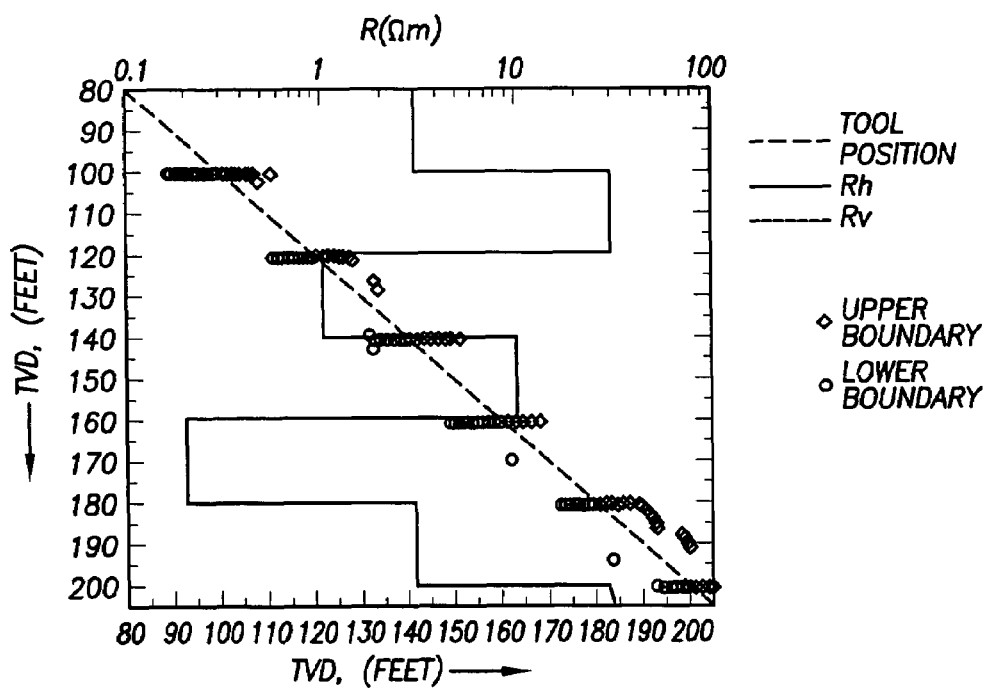

An inversion algorithm is then applied. This algorithm accepts any measurements as input, and then finds the most consistent model to the data. Multiple models are run, and the best model is selected automatically. A typical resistivity profile reconstruction is shown in FIG. 10A, while the corresponding boundary (structure) reconstruction is depicted in FIG. 10B. These results indicate that the solutions are more accurate when approaching conductive beds than when approaching resistive beds. This is expected since the directional responses are primarily defined by the conductive bed, and have far better sensitivity to resistivity variation in conductive layers above and below, then in the resistivity variation of resistive shoulder beds.

Figure 11:
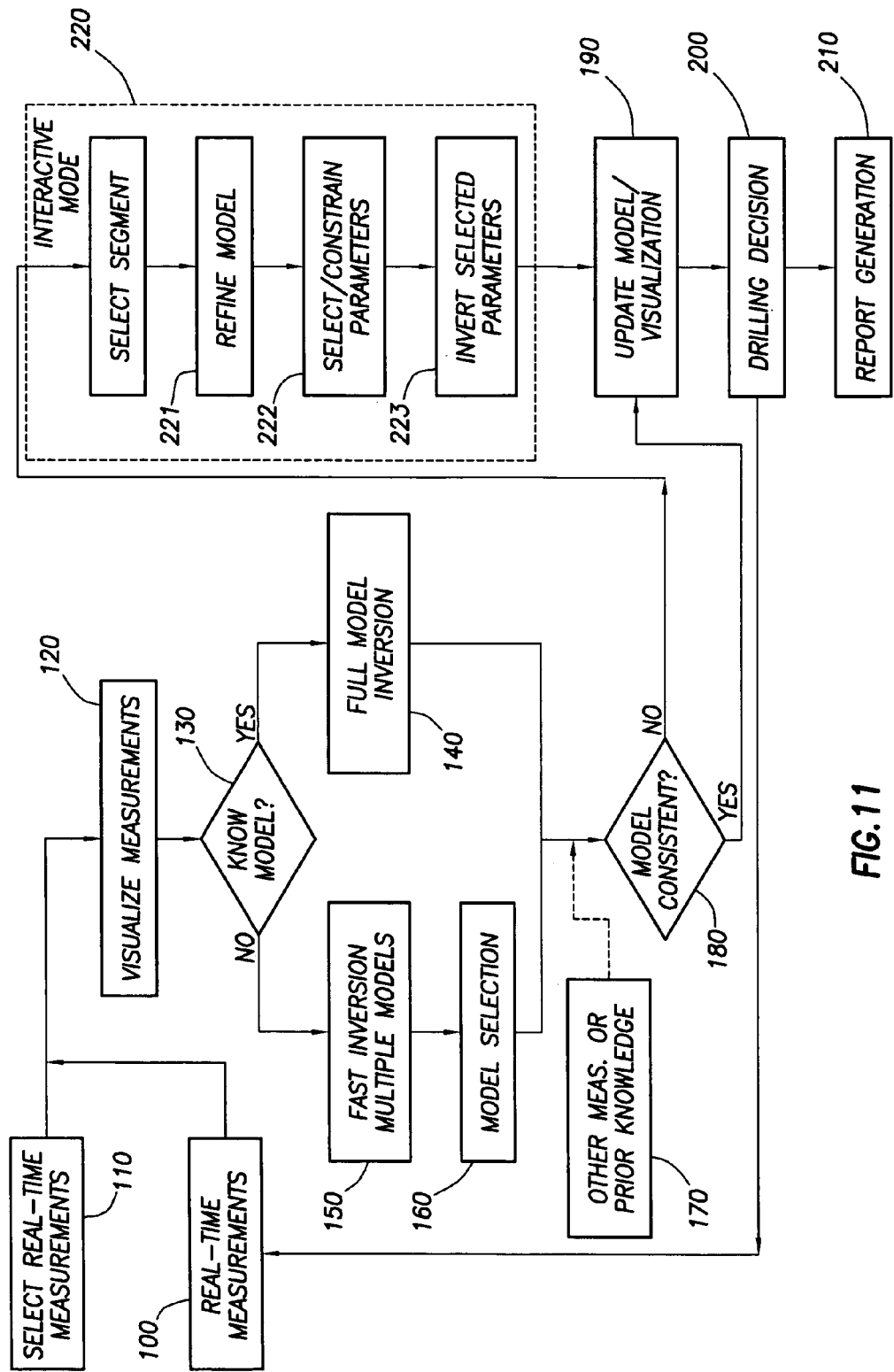
FIG. 11 is a work flow diagram for geosteering in accordance with one aspect of the present invention.

Another aspect of the present invention is the utilization of the determined boundary distances to make geosteering decisions. The overall geosteering workflow can be described with reference to FIG. 11. First, real-time directional measurements are selected at box 110, using the on-the-fly fitting technique as described above. The directional measurements are then visualized, at box 120 by showing the raw log responses, or using cross-plot charts as shown in FIGS. 8 and 10 (and described elsewhere herein).

Decision point 130 then directs the work flow, depending on whether an appropriate model has been identified. If the formation layout or some other parameters are known, this approach allows the user to fix the known parameters. For example the upper shoulder bed resistivity or layering may be known to be stable, and it may be known with high certainty that there is no boundary below. Such information allows, e.g., selection of model with a single boundary, and fixed shoulder bed resistivity. Mathematically, it means that only three parameters need to be inverted, horizontal and vertical resistivity of the bed ($R_h$ and $R_v$), and distance to upper boundary. This is an example of full model inversion (box 140), which insures consistent interpretation, and avoids confusion in limiting cases where there may be some non-physical model with better mathematical fit of measurement to be selected.

Alternatively, fast approximated inversions with multiple models are run (box 150) along with an automatic model selection algorithm (box 160). The algorithm runs different models, from simple (no boundary, isotropic formation) to most complex (two distances and anisotropic formation), including:

homogenous isotropic (single parameter: resistivity);
homogenous anisotropic (two parameters: Rh and Rv);
single boundary isotropic formation, boundary above or below (three parameters: Rbed, Rshoulder and distance to boundary);
single boundary anisotropic formation, boundary above or below (four parameters: Rbed_h, Rbed_v, Rshoulder and distance to boundary);
two boundary isotropic formation three parameters: (five parameters: Rbed, Rshoulder_up, Rshoulder_down and distance to boundary above and below the tool); and
two boundary anisotropic formation three parameters: (six parameters: Rbed_h, Rbed_v, Rshoulder_up, Rshoulder_down and distance to boundary above and below the tool).

A solution is obtained for each model.

The model selection algorithm uses physics-based constraints for directional measurements, and imposes conditions that select the "simplest model that fits the data" (Bayes" razor). The classic Akaike Information Criterion (AIC) or Bayesian information criterion can be used, to penalize the model complexity.

A model validation is then applied, at decision point 180, to determine whether the selected model is consistent with prior knowledge about the geological formation or other measurements such as gamma-ray, or other measurements available in the real-time as represented by box 170. If the model is consistent with the other data, it's accepted as input (box 190) to the drilling decision (box 200), and an appropriate report is generated at box 210. The implementation of the drilling decision will result in further real-time directional measurements (box 100), which are again input to the fitting and visualization steps of boxes 110 and 120. If the selected inversion model is inconsistent with the other measurements from box 170, then an update of the model is appropriate. In this instance, an interactive mode sub-flow 220 is applied that is consistent with the complex inversion program of the "584 patent.

Often, the automatic inversion may create interpretation that is not consistent. It can be caused by the measurement noise caused by electronics as well as the "model noise", i.e., the fact that the real model is different from all the models run in the inversion. For example, borehole, invasion, thin layers, cross-bedding and finite tool size are not included in models, and they can cause mismatch in the fitting process.

The flexibility and ability of a user to interactively select the common model for a segment of data is key for successful interpretation of the measurements. The software defining the interactive mode sub-flow (box 220) has features that allow: model refinement (box 221) based on trends, prior knowledge, or an external source of information; constraining or fixing some inversion parameters (box 222); removing some measurements that may be more affected by the environment not included in the model; and re-processing the data (box 223).

Figure 12:
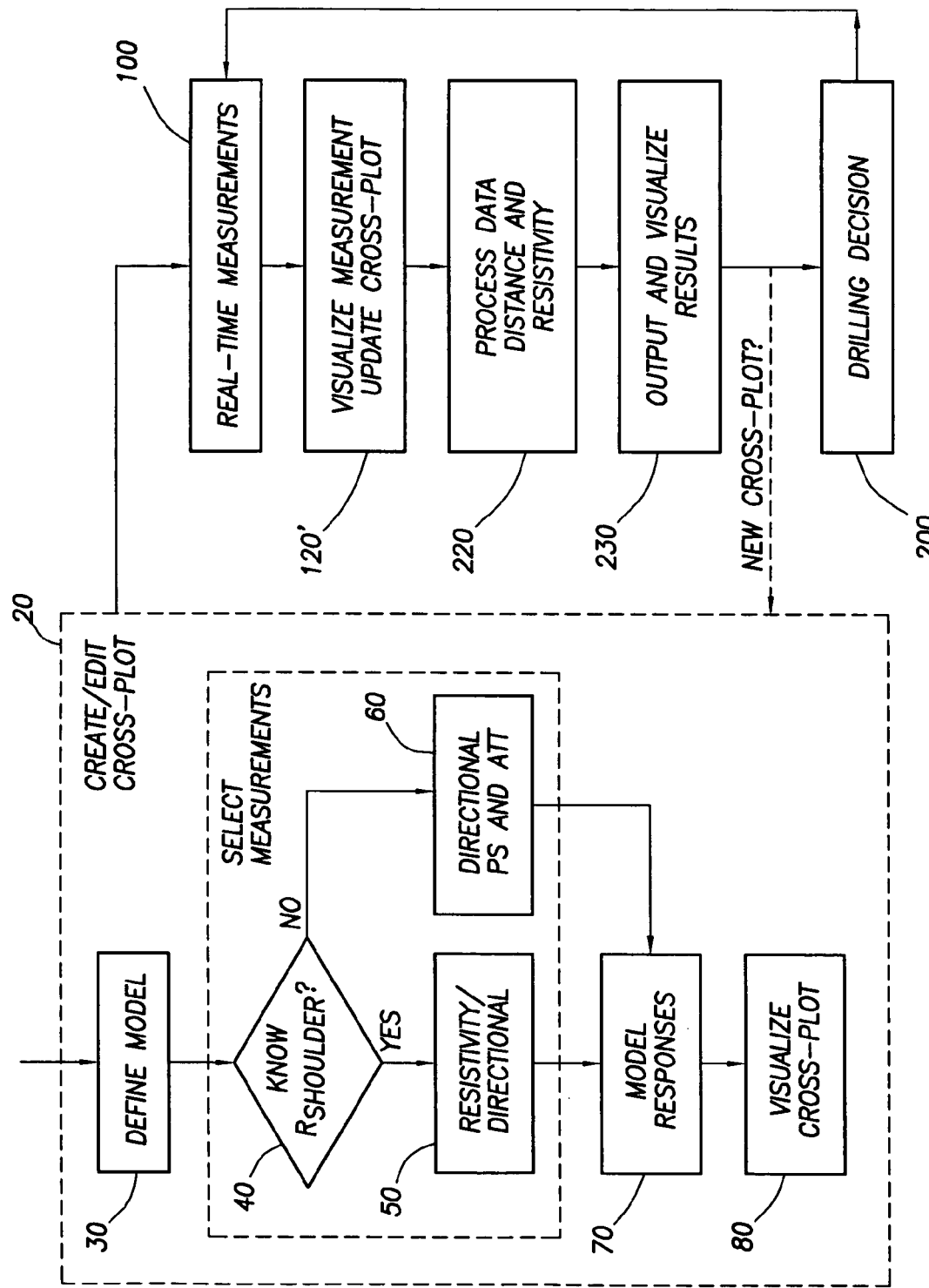
FIG. 12 is a work flow diagram for a cross-plot having utility for determining bed boundary distances and applying such distances in real-time geosteering, in accordance with further aspects of the present invention.

FIG. 12 illustrates a general workflow for creating cross-plots of directional measurements that provide boundary distances, as described elsewhere herein. The creation or modification of a cross-plot is represented by sub-flow 20, which is initiated by defining an appropriate model (box 30). Appropriate directional measurements are then selected according to the ability to determine/predict shoulder resistivity (box 40). If shoulder-bed resistivity is reliably known as is often the case in big fields where many wells are drilled, interpretation is based on one resistivity and one directional measurement (box 50), to determine the true bed resistivity (shoulder-bed corrected) and the distance-to-boundary. If shoulder bed resistivity is not known, it is recommended to use the crossplot of two directional measurements (box 60), as illustrated in FIG. 9, to determine the shoulder-bed resistivity and distance to boundary. The selected measurements are input to the defined model to generate responses, at box 70, which may be visualized (box 80) as indicated by FIG. 8 and 9. In cases when neither resistivity is known, but the ranges of their difference is known, it is possible to create three-dimensional cross-plots, by combining one resistivity and two directional measurements.

Once the cross-plot has been created or updated (sub-flow 20), it may be continuously updated with additional real-time measurements (box 100) and visualized (box 120"). Processing the cross-plot of directional measurements yields the distance to one or more formation boundaries and the resistivity of one or more beds (box 220), which may be output and visualized (box 230) to instruct the drilling decision, at box 200.

Figure 13:
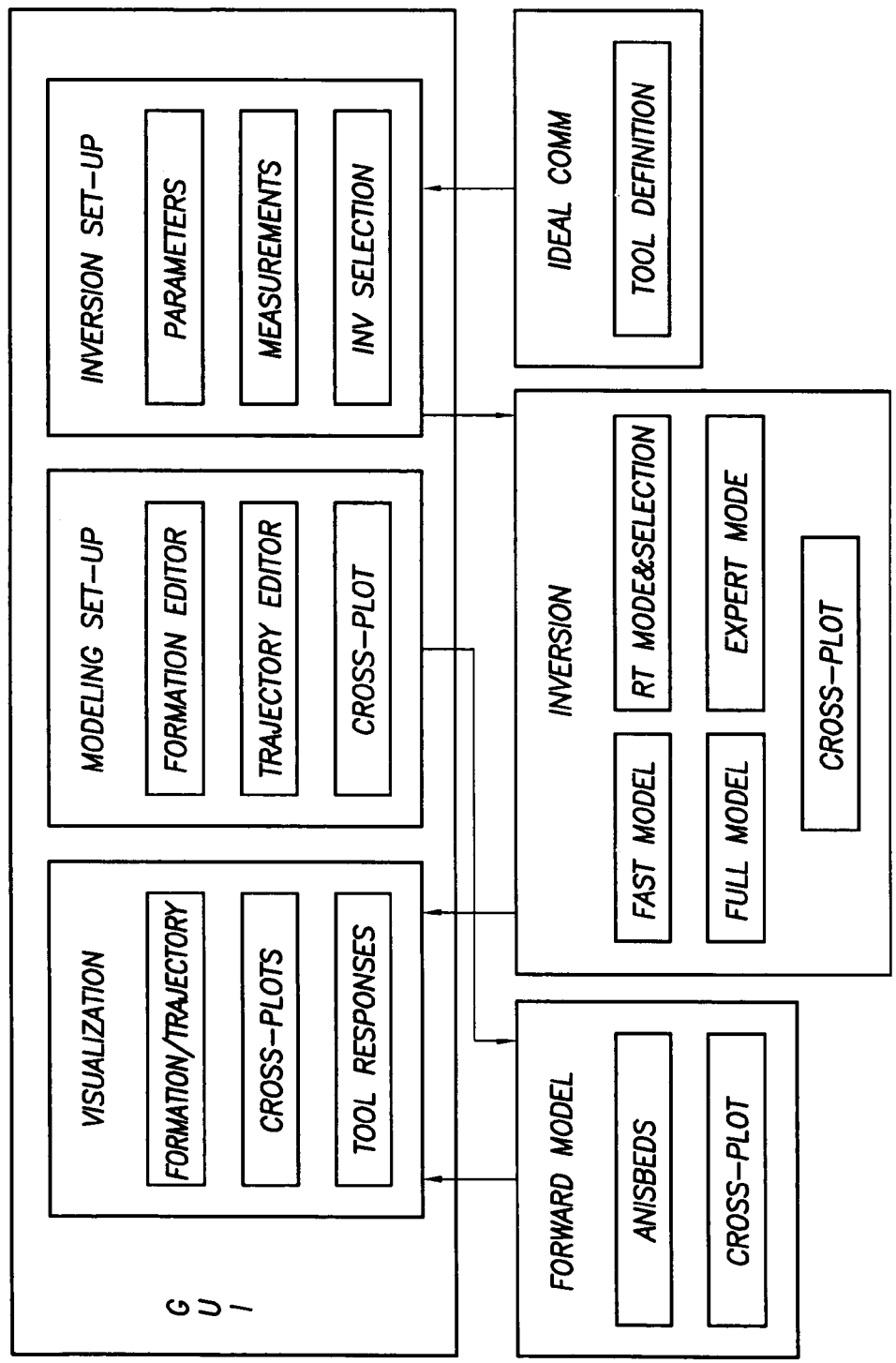
FIG. 13 shows a block diagram representing the structure of a GUI for displaying inversion-based formation bed models.

According to another aspect of the present invention, a graphical user interface (GUI) has been created to facilitate the use of the program and to display the inverted bedding models for user visualization. A block diagram illustrating the structure of the GUI and different ways of handling data is shown in FIG. 13. Accordingly, the GUI allows:

running forward model for given layering cross-plots for measurement sensitivity analysis inversion of real-time data characterized by: cross-plot-based inversion of one resistivity and one distance (for given shoulder or bed resistivity); utomatic interpretation, using fast inversion based on superposition of single boundary responses and automatic model selection, physics-based constraints, combined with Akaike Information Criterion or model mixing; interactive interpretation based on full inversion of any parameter (up to 6) from three-layer model (bed and two shoulders two distances and four resistivities), running full layered medium model in the inversion loop, allowing model refinements, with options to select/deselect some inversion parameters and constrain them and/or select and re-weigh available measurements; switching between fast and interactive mode for model refinement visualization of measurement and inversion.

Figure 14:
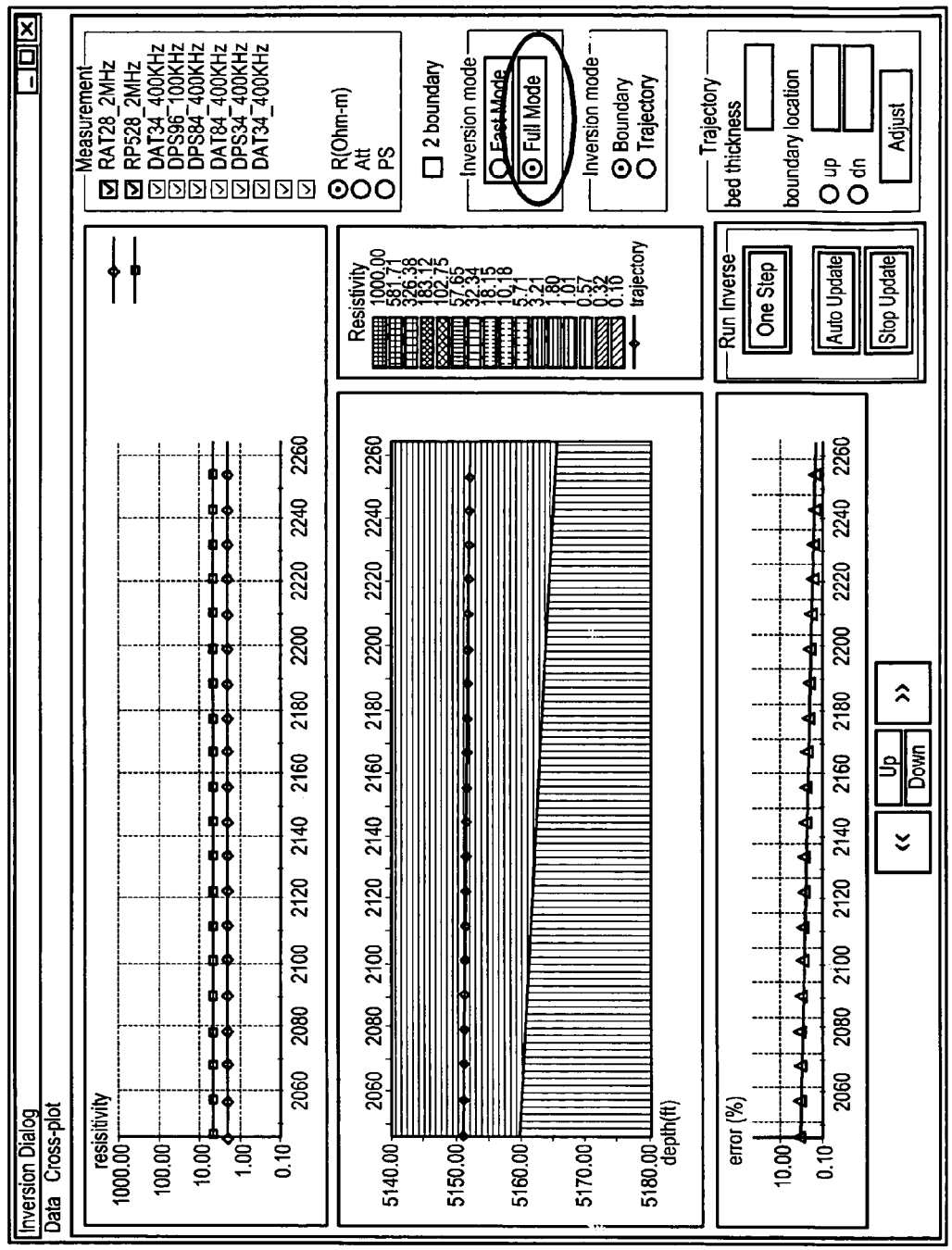
FIG. 14 shows a computer-generated visualization of geosteering inversion associated with the GUI of FIG. 13.

An example of an interpretation screen is shown in FIG. 14. Both the measurements that are used in the inversion, and the borehole trajectory, are displayed on the screen. The inverted results, including the distance to upper and lower boundaries, resistivities of bed and two shoulder-beds are graphically displayed. The results are shown point-by-point, and based on reconstructed positions of boundaries. It is possible to infer the stratigraphic dip. It should be noted that although the forward model run in the inversion loop is a 1D-layered medium, the approach allows for the building of more complex formation images, including non-parallel boundaries detection of faults, including sub-seismic faults.

Anisotropy Evaluation

With A TRR configuration having the transmitter antenna and at least one of the receiver antennas being tilted, anisotropy measurements can be performed, according to the teachings of U.S. patent application Publication No. 2003/020029 ("Omeragic et al"). The detected EM signals relating to a phase difference or a magnitude ratio are combined to determine the anisotropy. Note that a novel borehole compensation technique is disclosed by Omeragic et al for such a measurement.

The directional part of such combined measurements can be analyzed in the same way as described above. Accordingly, the component coefficients can be used to derive anisotropy through inversion with the technique disclosed in U.S. Pat. No. 6,594,584 (also described above). This is true for all the dip angles.

Those skilled in the art will appreciate that in highly deviated boreholes the traditional propagation measurement with axial coils already provides acceptable anisotropy sensitivity, obviating the need for the borehole compensation technique in those boreholes.

It will be apparent to those skilled in the art that this invention may be implemented using one or more suitable general-purpose computers having appropriate hardware and programmed to perform the processes of the invention. The programming may be accomplished through the use of one or more program storage devices readable by the computer processor and encoding one or more programs of instructions executable by the computer for performing the operations described above. The program storage device may take the form of, e.g., one or more floppy disks; a CD ROM or other optical disk; a magnetic tape; a read-only memory chip (ROM); and other forms of the kind well known in the art or subsequently developed. The program of instructions may be "object code," i.e., in binary form that is executable more-or-less directly by the computer; in "source code" that requires compilation or interpretation before execution; or in some intermediate form such as partially compiled code. The precise forms of the program storage device and of the encoding of instructions are immaterial here. Thus these processing means may be implemented in the surface equipment, in the tool, or shared by the two as known in the art. It will also be appreciated that the techniques of the invention may be used with any type of well logging system, e.g. wireline tools, LWD/MWD tools, or LWT tools.

It will be understood from the foregoing description that various modifications and changes may be made in the preferred and alternative embodiments of the present invention without departing from its true spirit.

This description is intended for purposes of illustration only and should not be construed in a limiting sense. The scope of this invention should be determined only by the language of the claims that follow. The term "comprising" within the claims is intended to mean "including at least" such that the recited listing of elements in a claim are an open group. "A," "an" and other singular terms are intended to include the plural forms thereof unless specifically excluded.

What is claimed is:

1. A method to characterize a formation penetrated by a borehole, comprising: disposing within the borehole a logging instrument having a transmitter antenna and a receiver antenna, at least one of the antennas having a dipole moment that is tilted but not transverse relative to a longitudinal axis of the instrument;

rotating the logging instrument azimuthally within the borehole;

transmitting, at various azimuthal angles, electromagnetic energy from the transmitter antenna into the formation;

receiving at the receiver antenna voltage signals as a function of the azimuthal angle of the logging instrument;

fitting the voltage signals to an azimuthal-angle-dependent function; and characterizing the formation using the function.

2. The method of claim 1, wherein the fitting step is executed while the voltage signals are being received.

3. The method of claim 1, further comprising stopping the fitting when convergence has been achieved.

4. The method of claim 1, wherein the transmitting, receiving, and fitting are repeated for subsequent acquisition cycles.

5. The method of claim 1, wherein the function used in the fitting is sinusoidal and dependent on components of a coupling tensor.

6. The method of claim 1, wherein fitting coefficients of the function are dependent on at least one of resistivity, borehole deviation, relative dip, and azimuth angle.

7. The method of claim 1, wherein the function includes one or more of a constant term, a sin $\phi$ term, a cos q$\phi$ term, a sin 2$\phi$ term and a cos 2$\phi$ term.

8. The method of claim 1, further comprising using the function for geostecring or to determine formation parameters.

9. The method of claim 1, where the fitting comprises using a Fourier Transform or a Fast Fourier Transform.

10. The method of claim 1, wherein the dipole moment of one antenna is azimuthally rotated relative to the dipole moment of the other antenna.

11. The method of claim 1, further comprising combining the fitting coefficients of the function to generate a symmetrized and/or an anti-symmetrized response.

12. A method to characterize a formation penetrated by a borehole, comprising:
   disposing within the borehole a logging instrument having at least first and second symmetrization pairs of antennas, wherein at least one of the antennas has a dipole moment that is tilted but not transverse relative to a longitudinal axis of the instrument;
   azimuthally rotating the logging instrument within the borehole;
   transmitting, at various azimuthal angles, electromagnetic energy from a transmitter antenna of the first symmetrization pair into the formation;
   receiving at a receiver antenna of the first symmetrization pair first voltage signals as a function of the azimuthal angle of the logging instrument;
   transmitting, at various azimuthal angles, electromagnetic energy from a transmitter antenna of the second symmetrization pair into the formation;
   receiving at a receiver antenna of the second symmetrization pair second voltage signals as a function of the azimuthal angle of the logging instrument;
   fitting the first voltage signals to a first azimuthal-angle-dependent function;
   fitting the second voltage signals to a second azimuthal-angle-dependent function; and
   characterizing the formation using the first and second functions.

13. The method of claim 12, wherein at least one of the antennas is azimuthally rotated relative to at least one of the other antennas.

14. The method of claim 12, wherein the first symmetrization pair is azimuthally rotated relative to the second symmetrization pair.

15. The method of claim 12, wherein the first symmetrization pair is coplanar with the second symmetrization pair.

16. The method of claim 12, wherein the fitting steps are executed while the first and second voltage signals are being received.

17. The method of claim 12, further comprising stopping the fitting when a convergence criterion has been achieved.

18. The method of claim 12, wherein the transmitting, receiving, and fitting are repeated for subsequent acquisition cycles.

19. The method of claim 12, wherein the functions used in the fitting are sinusoidal and dependent on components of a coupling tensor.

20. The method of claim 12, wherein fitting coefficients of the functions are dependent on at least one of resistivity, borehole deviation, relative dip, and azimuth angle.

21. The method of claim 12, wherein the functions include one or more of a constant term, a sin $\phi$ term, a cos $\phi$ term, a sin 2$\phi$ term and a cos 2$\phi$ term.

22. The method of claim 12, further comprising combining fitting coefficients of the functions to generate a symmetrized and/or an anti-symmetrized response.

23. The method of claim 12, further comprising characterizing the noise of the first and second voltage signals using fitting coefficients of the functions.

24. The method of claim 12, wherein the functions are sinusoidal and fitting coefficients of the functions used to characterize the noise are second or higher harmonic terms of the functions.

25. The method of claim 12, further comprising characterizing the noise of the first and second voltage signals by combining the first and second voltage signals.

26. The method of claim 12, further comprising using fitting coefficients of the functions to determine a bed orientation angle.

27. The method of claim 12, further comprising evaluating each function at two azimuthal angles.

28. The method of claim 27, further comprising using fitting coefficients of the functions to determine a bed orientation angle, and wherein the two azimuthal angles are 0 and 180 degrees relative to the bed orientation angle.

29. The method of claim 12, further comprising calculating a common azimuthal angle for the first and second voltage signals using weighted averaging of fitting coefficients for real and imaginary parts of the first and second voltage signals.

30. The method of claim 12, further comprising applying an inversion technique to interpret the formation characteristics.

31. The method of claim 12, further comprising combining fitting coefficients of the functions to determine a distance to one or more bed boundaries.

* * * * *